US012658537B2

(12) United States Patent
Katsumoto et al.

(10) Patent No.: US 12,658,537 B2
(45) Date of Patent: Jun. 16, 2026

(54) SECONDARY BATTERY WITH SANDWICHED PORTION OF COUPLING WIRING LINE

(71) Applicant: MURATA MANUFACTURING CO., LTD., Kyoto (JP)

(72) Inventors: Taichi Katsumoto, Kyoto (JP); Masayuki Kageyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 707 days.

(21) Appl. No.: 17/985,316

(22) Filed: Nov. 11, 2022

(65) Prior Publication Data

US 2023/0083371 A1 Mar. 16, 2023

Related U.S. Application Data

(63) Continuation of application No. PCT/JP2020/046512, filed on Dec. 14, 2020.

(30) Foreign Application Priority Data

May 14, 2020 (JP) ................................. 2020-085530

(51) Int. Cl.
*H01M 2/26* (2006.01)
*H01M 10/04* (2006.01)
(Continued)

(52) U.S. Cl.
CPC ..... *H01M 50/547* (2021.01); *H01M 10/0427* (2013.01); *H01M 10/0431* (2013.01);
(Continued)

(58) Field of Classification Search
CPC ............. H01M 50/547; H01M 50/548; H01M 50/552; H01M 50/562; H01M 50/559;
(Continued)

(56) References Cited

U.S. PATENT DOCUMENTS

| | | | |
|---|---|---|---|
| 2006/0073382 A1 | 4/2006 | Urano et al. | |
| 2012/0015224 A1 | 1/2012 | Pytlik et al. | |
| 2018/0241013 A1* | 8/2018 | Vuille | H01M 50/153 |

FOREIGN PATENT DOCUMENTS

| | | |
|---|---|---|
| CN | 1755964 | 4/2006 |
| CN | 102318122 A | 1/2012 |

(Continued)

OTHER PUBLICATIONS abstract of JP-2019153383) Shinya et al, Power Storage Device, Sep. 12, 2019.*

(Continued)

*Primary Examiner* — Raymond Alejandro
(74) *Attorney, Agent, or Firm* — K&L Gates LLP

(57) ABSTRACT

A secondary battery includes an outer package member, a battery device, an external terminal, and a coupling wiring line. The battery device is contained inside the outer package member, and includes a first electrode and a second electrode. The external terminal is attached to the outer package member and insulated from the outer package member. The coupling wiring line is coupled to each of the first electrode and the external terminal. A portion of the coupling wiring line is insulated from each of the outer package member and the second electrode, and is sandwiched by the outer package member and the battery device.

15 Claims, 11 Drawing Sheets

(51) Int. Cl.
*H01M 10/0525* (2010.01)
*H01M 50/46* (2021.01)
*H01M 50/547* (2021.01)
*H01M 50/559* (2021.01)

(52) U.S. Cl.
CPC ....... *H01M 10/0525* (2013.01); *H01M 50/46* (2021.01); *H01M 50/559* (2021.01)

(58) Field of Classification Search
CPC ............... H01M 50/46; H01M 50/463; H01M 10/0427; H01M 10/0431; H01M 10/0422; H01M 10/0525; H01M 10/052
See application file for complete search history.

(56) References Cited

FOREIGN PATENT DOCUMENTS

| | | |
|---|---|---|
| CN | 209691830 | 11/2019 |
| JP | H10154505 A | 6/1998 |
| JP | 2006100097 A | 4/2006 |
| JP | 2012517658 A | 8/2012 |
| JP | 2013097903 A | 5/2013 |
| JP | 2019145273 A | 8/2019 |
| JP | 2019153383 A * 9/2019 ............. H01M 2/34 |

OTHER PUBLICATIONS

Chinese Office Action issued Nov. 18, 2024 in corresponding Chinese Application No. 202080100835.8.
Chinese Search Report for corresponding CN application No. 2020801008358, dated Apr. 25, 2025. (2 pages).
Chinese Office Action for corresponding CN application No. 2020801008358, dated Apr. 29, 2025. (7 pages).
Japanese Office Action issued Dec. 12, 2023 in corresponding Japanese Application No. 2022-522505.
International Search Report of corresponding PCT application PCT/JP2020/046512, dated Feb. 16, 2021.

\* cited by examiner 41 42 40

41A 41B 42A 42B 43

SECONDARY BATTERY WITH SANDWICHED PORTION OF COUPLING WIRING LINE

CROSS REFERENCE TO RELATED APPLICATIONS

The present application is a continuation of PCT patent application no. PCT/JP2020/046512, filed on Dec. 14, 2020, which claims priority to Japanese patent application no. JP2020-085530, filed on May 14, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolyte that are contained inside an outer package member. A configuration of the secondary battery has been considered in various ways.

Specifically, in order to obtain superior safety in a secondary battery of a cylindrical type, a positive electrode current collector tab is coupled to each of a positive electrode plate and a positive electrode terminal, and the positive electrode current collector tab is bent in an S-shape. In order to prevent the occurrence of an internal short circuit in a secondary battery of a cylindrical type, a lead piece is coupled to each of an electrode plate and a sealing plate, and the lead piece is bent generally in a V-shape. In order to improve durability against mechanical loads in a secondary battery of a button type, a composite body (rolled up in a spiral shape) including two kinds of electrodes and a separator is contained inside a cup part and a top part, and an output conductor is coupled to each of one of the electrodes and the top part.

SUMMARY

The present technology relates to a secondary battery.

Consideration has been given in various ways to improve performance of a secondary battery; however, the secondary battery still remains insufficient in physical durability. Accordingly, there is still room for improvement in terms thereof.

The present technology has been made in view of such an issue and relates to providing a secondary battery that is able to achieve superior physical durability according to an embodiment.

A secondary battery according to an embodiment includes an outer package member, a battery device, an external terminal, and a coupling wiring line. The battery device is contained inside the outer package member, and includes a first electrode and a second electrode. The external terminal is attached to the outer package member and insulated from the outer package member. The coupling wiring line is coupled to each of the first electrode and the external terminal. A portion of the coupling wiring line is insulated from each of the outer package member and the second electrode, and is sandwiched by the outer package member and the battery device.

According to the secondary battery of an embodiment, the battery device including the first electrode and the second electrode is contained inside the outer package member; the external terminal is insulated from the outer package member and attached to the outer package member; the coupling wiring line is coupled to each of the first electrode and the external terminal; and the portion of the coupling wiring line is insulated from each of the outer package member and the second electrode, and is sandwiched by the outer package member and the battery device. This makes it possible to achieve superior physical durability.

Note that effects of the present technology are not necessarily limited to those described herein and may include any of a series of suitable effects.

DETAILED DESCRIPTION

One or more embodiments of the present technology are described below in further detail including with reference to the drawings.

A description is given first of a secondary battery according to an embodiment.

The secondary battery to be described here has a flat and columnar three-dimensional shape, and is commonly referred to by a term such as a coin type or a button type. As will be described later, the secondary battery includes two bottom parts opposed to each other, and a sidewall part lying between the two bottom parts. This secondary battery has a height smaller than an outer diameter. The "outer diameter" is a diameter (a maximum diameter) of each of the two bottom parts. The "height" is a distance (a maximum distance) from a surface of one of the bottom parts to a surface of another of the bottom parts.

Although a charge and discharge principle of the secondary battery is not particularly limited, the following description deals with a case where a battery capacity is obtained using insertion and extraction of an electrode reactant. The secondary battery includes a positive electrode, a negative electrode, and an electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains the battery capacity using insertion and extraction of lithium is a so-called lithium-ion secondary battery. In the lithium-ion secondary battery, lithium is inserted and extracted in an ionic state.

Figure 1:
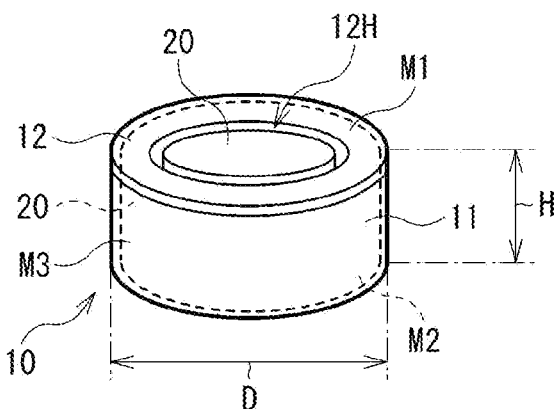
FIG. 1 is a perspective view of a configuration of a secondary battery according to an embodiment of the present technology.
Figure 2:
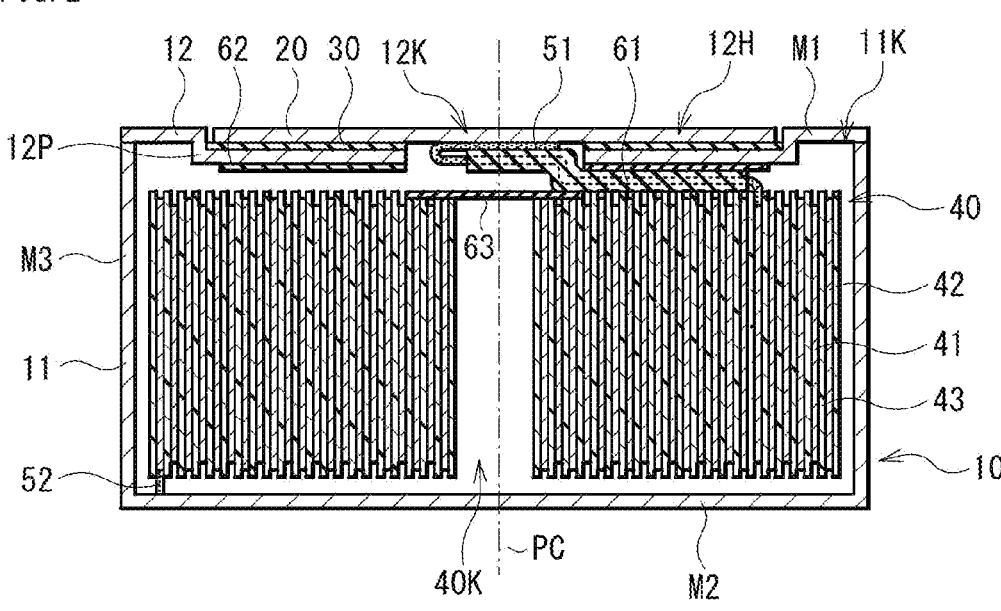
FIG. 2 is a sectional view of the configuration of the secondary battery illustrated in FIG. 1.
Figures 3, 4:
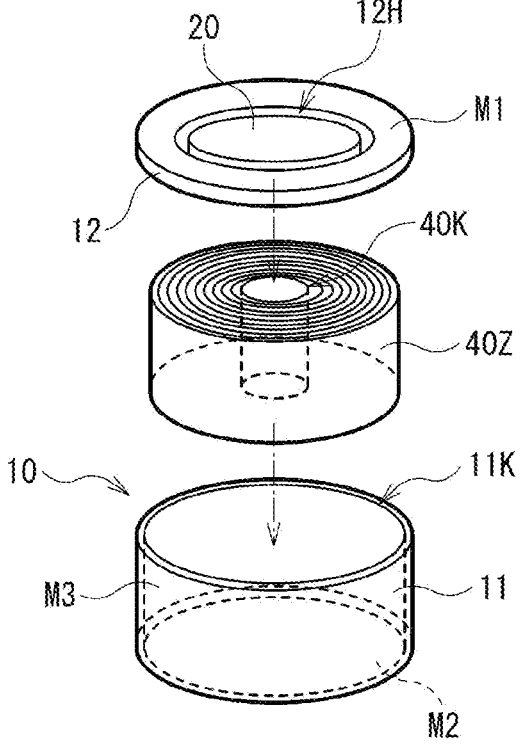
FIG. 3 is a sectional view of a configuration of a battery device illustrated in FIG. 2.
FIG. 4 is a perspective view of a configuration of an outer package can to be used in a process of manufacturing the secondary battery.

FIG. 1 illustrates a perspective configuration of the secondary battery. FIG. 2 illustrates a sectional configuration of the secondary battery illustrated in FIG. 1. FIG. 3 illustrates a sectional configuration of a battery device 40 illustrated in FIG. 2. Note that in FIG. 2, a positive electrode lead 51 is shaded, and FIG. 3 illustrates only a portion of the sectional configuration of the battery device 40 in an enlarged manner.

For convenience, the following description is given with an upper side of each of FIGS. 1 and 2 assumed as an upper side of the secondary battery, and a lower side of each of FIGS. 1 and 2 assumed as a lower side of the secondary battery.

The secondary battery to be described here has such a three-dimensional shape that a height H is smaller than an outer diameter D, as illustrated in FIG. 1. In other words, the secondary battery has a flat and columnar three-dimensional shape. Here, the three-dimensional shape of the secondary battery is flat and cylindrical (circular columnar).

Dimensions of the secondary battery are not particularly limited. However, for example, the outer diameter D is within a range from 3 mm to 30 mm both inclusive, and the height H is within a range from 0.5 mm to 70 mm both inclusive. Note that a ratio of the outer diameter D to the height H, i.e., D/H, is greater than 1. Although not particularly limited, an upper limit of the ratio D/H is preferably less than or equal to 25.

As illustrated in FIGS. 1 to 3, the secondary battery includes an outer package can 10, an external terminal 20, the battery device 40, and the positive electrode lead 51.

Here, the secondary battery further includes a gasket 30, a negative electrode lead 52, a sealant 61, and insulating films 62 and 63.

As illustrated in FIGS. 1 and 2, the outer package can 10 is a hollow outer package member to contain the battery device 40 and other components therein.

Here, the outer package can 10 has a flat and cylindrical three-dimensional shape corresponding to the three-dimensional shape of the secondary battery which is flat and cylindrical. Accordingly, the outer package can 10 includes two bottom parts M1 and M2 opposed to each other, and a sidewall part M3 lying between the bottom parts M1 and M2. An upper end part of the sidewall part M3 is coupled to the bottom part M1. A lower end part of the sidewall part M3 is coupled to the bottom part M2. As described above, the outer package can 10 is cylindrical. Thus, the bottom parts M1 and M2 are each circular in planar shape, and a surface of the sidewall part M3 is a convexly curved surface.

The outer package can 10 includes a container part 11 and a cover part 12 that are welded to each other. The container part 11 is sealed by the cover part 12. That is, the cover part 12 is welded to the container part 11.

The container part 11 is a container member having a flat and cylindrical shape and containing the battery device 40 and other components inside. The container part 11 has a hollow structure with an upper end part open and a lower end part closed, and thus has an opening 11K at the upper end part.

The cover part 12 is a generally disk-shaped cover member that closes the opening 11K of the container part 11, and has a through hole 12K. As described above, the cover part 12 is welded to the container part 11 at the opening 11K. The external terminal 20 is attached to the cover part 12, and the cover part 12 thus supports the external terminal 20.

Here, the cover part 12 is so bent as to protrude in part toward the inside of the container part 11. The cover part 12 is thus recessed in part. In this case, a portion of the cover part 12 is so bent as to form a level difference toward a center of the cover part 12. The cover part 12 thus includes a protruding part 12P and a recessed part 12H. The protruding part 12P is formed by the cover part 12 being so bent as to protrude in part toward the inside of the container part 11. The recessed part 12H is formed by the protruding part 12P. Note that the through hole 12K is provided in the protruding part 12P (or the recessed part 12H).

As described above, the outer package can 10 is a welded can in which two members (the container part 11 and the cover part 12) are welded to each other. As a result, the outer package can 10 after undergoing welding is physically a single member as a whole, and is thus in a state of being not separable into the two members (the container part 11 and the cover part 12) afterward.

The outer package can 10 as a welded can does not include any portion folded over another portion, and does not include any portion in which two or more members lie over each other.

The wording "does not include any portion folded over another portion" means that the outer package can 10 is not so processed as to include a portion folded over another portion. The wording "does not include any portion in which two or more members lie over each other" means that the outer package can 10 after completion of the secondary battery is physically a single member and is thus not separable into two or more members afterward. In other words, the outer package can 10 is not in a state in which two or more members lie over each other and are assembled to each other in such a manner as to be separable afterward.

In particular, the outer package can 10 as a welded can is a so-called crimpless can, being different from a crimped can which is formed by means of crimping processing. A reason for employing the crimpless can is that this increases a device space volume inside the outer package can 10, and accordingly increases an energy density per unit volume of the secondary battery. The "device space volume" refers to a volume (an effective volume) of an internal space of the outer package can 10 available for containing therein the battery device 40 which is to be involved in charging and discharging reactions.

Here, the outer package can 10 including the container part 11 and the cover part 12 is electrically conductive. The outer package can 10 is coupled to the battery device 40 (a negative electrode 42) via the negative electrode lead 52. The outer package can 10 thus serves as an external coupling terminal for the negative electrode 42. A reason for employing such a configuration is that this makes it unnecessary for the secondary battery to be provided with an external coupling terminal for the negative electrode 42 separate from the outer package can 10, and thus prevents a decrease in device space volume resulting from providing the external coupling terminal for the negative electrode 42. As a result, the device space volume increases, and accordingly, the energy density per unit volume of the secondary battery increases.

Specifically, the outer package can 10 including the container part 11 and the cover part 12 includes one or more of electrically conductive materials including, without limitation, a metal material and an alloy material. Examples of the electrically conductive materials include iron, copper, nickel, stainless steel, an iron alloy, a copper alloy, and a nickel alloy. Although the stainless steel is not particularly limited in kind, specific examples of the stainless steel include SUS304 stainless steel and SUS316 stainless steel. Note that the container part 11 and the cover part 12 may include the same material, or may include respective different materials.

As will be described later, the outer package can 10 (the cover part 12) is insulated, via the gasket 30, from the external terminal 20 which serves as an external coupling terminal for a positive electrode 41. A reason for this is that contact (a short circuit) between the outer package can 10 (the external coupling terminal for the negative electrode 42) and the external terminal 20 (the external coupling terminal for the positive electrode 41) is prevented.

As illustrated in FIGS. 1 and 2, the external terminal 20 is a coupling terminal to be coupled to electronic equipment when the secondary battery is mounted on the electronic equipment. As described above, the external terminal 20 is attached to the outer package can 10 (the cover part 12), and is thus supported by the cover part 12.

Here, the external terminal 20 is coupled to the battery device 40 (the positive electrode 41) via the positive electrode lead 51. The external terminal 20 thus serves as the external coupling terminal for the positive electrode 41. Accordingly, upon use of the secondary battery, the secondary battery is coupled to electronic equipment via the external terminal 20 (the external coupling terminal for the positive electrode 41) and the outer package can 10 (the external coupling terminal for the negative electrode 42). This allows the electronic equipment to operate with use of the secondary battery as a power source.

The external terminal 20 is a flat and generally plate-shaped member, and is disposed inside the recessed part 12H with the gasket 30 interposed therebetween. The external terminal 20 is thus insulated from the cover part 12 via the gasket 30. Here, the external terminal 20 is placed inside the recessed part 12H so as not to protrude above the cover part 12. A reason for this is that this decreases the height H of the secondary battery and therefore increases the energy density per unit volume of the secondary battery as compared with a case where the external terminal 20 protrudes above the cover part 12.

Note that the external terminal 20 has an outer diameter smaller than an inner diameter of the recessed part 12H. Thus, the external terminal 20 is separated from the cover part 12 surrounding the external terminal 20. Accordingly, the gasket 30 is disposed only in a portion of a region between the external terminal 20 and the cover part 12 (the recessed part 12H). More specifically, the gasket 30 is disposed only at a location where the external terminal 20 and the cover part 12 would be in contact with each other if it were not for the gasket 30.

The external terminal 20 includes one or more of electrically conductive materials including, without limitation, a metal material and an alloy material. Examples of the electrically conductive materials include aluminum and an aluminum alloy. Note that the external terminal 20 may include a cladding material. The cladding material includes an aluminum layer and a nickel layer that are disposed in order from a side closer to the gasket 30. In the cladding material, the aluminum layer and the nickel layer are roll-bonded to each other.

The gasket 30 is an insulating member disposed between the outer package can 10 (the cover part 12) and the external terminal 20, as illustrated in FIG. 2. The external terminal 20 is fixed to the cover part 12 via the gasket 30. The gasket 30 is ring-shaped in a plan view, and has a through hole at a location corresponding to the through hole 12K. The gasket 30 includes one or more of insulating materials including, without limitation, a polymer compound having an insulating property. Examples of the insulating materials include polypropylene and polyethylene.

A range of placement of the gasket 30 is not particularly limited, and may be chosen as desired. Here, the gasket 30 is disposed in a gap between a top surface of the cover part 12 and a bottom surface of the external terminal 20 inside the recessed part 12H.

The battery device 40 is a power generation device that causes charging and discharging reactions to proceed. As illustrated in FIGS. 2 and 3, the battery device 40 is contained inside the outer package can 10. The battery device 40 includes the positive electrode 41 and the negative electrode 42. Here, the battery device 40 further includes a separator 43, and an electrolytic solution which is a liquid electrolyte. The electrolytic solution is not illustrated.

A center line PC illustrated in FIG. 2 is a line segment corresponding to a center of the battery device 40 in a direction along the outer diameter D of the secondary battery (the outer package can 10). That is, a position of the center line PC corresponds to a position of the center of the battery device 40.

The battery device 40 is a so-called wound electrode body. That is, in the battery device 40, the positive electrode 41 and the negative electrode 42 are stacked on each other with the separator 43 interposed therebetween, and the stack of the positive electrode 41, the negative electrode 42, and the separator 43 is wound. The positive electrode 41 and the negative electrode 42 are opposed to each other with the separator 43 interposed therebetween, and are wound. As a result, a winding center space 40K is present at the center of the battery device 40.

Here, the positive electrode 41, the negative electrode 42, and the separator 43 are wound in such a manner that the separator 43 is disposed in each of an outermost wind and an innermost wind. Respective numbers of winds of the positive electrode 41, the negative electrode 42, and the separator 43 are not particularly limited, and may be chosen as desired.

The battery device 40 has a three-dimensional shape similar to that of the outer package can 10. The battery device 40 thus has a flat and cylindrical three-dimensional shape. A reason for this is that this helps to prevent a so-called dead space (a gap between the outer package can 10 and the battery device 40) from resulting when the battery device 40 is placed inside the outer package can 10, and to thereby allow for efficient use of the internal space of the outer package can 10, as compared with a case where the battery device 40 has a three-dimensional shape different from that of the outer package can 10. As a result, the device space volume increases, and accordingly, the energy density per unit volume of the secondary battery increases.

The positive electrode 41 is a first electrode to be used to cause the charging and discharging reactions to proceed. As illustrated in FIG. 3, the positive electrode 41 includes a positive electrode current collector 41A and a positive electrode active material layer 41B.

The positive electrode current collector 41A has two opposed surfaces on each of which the positive electrode active material layer 41B is to be provided. The positive electrode current collector 41A includes an electrically conductive material such as a metal material. Examples of the metal material include aluminum.

The positive electrode active material layer 41B is provided on each of the two opposed surfaces of the positive electrode current collector 41A. The positive electrode active material layer 41B includes one or more of positive electrode active materials into which lithium is insertable and from which lithium is extractable. Note that the positive electrode active material layer 41B may be provided only on one of the two opposed surfaces of the positive electrode current collector 41A. The positive electrode active material layer 41B may further include other materials including, without limitation, a positive electrode binder and a positive electrode conductor. A method of forming the positive electrode active material layer 41B is not particularly limited, and specific examples thereof include a coating method.

The positive electrode active material includes a lithium compound. The term "lithium compound" is a generic term for a compound that includes lithium as a constituent element. More specifically, the lithium compound is a compound that includes lithium and one or more transition metal elements as constituent elements. A reason for this is that a high energy density is obtainable. Note that the lithium compound may further include one or more of other elements (excluding lithium and transition metal elements). Although not particularly limited in kind, the lithium compound is specifically an oxide, a phosphoric acid compound, a silicic acid compound, or a boric acid compound, for example. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

The negative electrode 42 is a second electrode to be used to cause the charging and discharging reactions to proceed. As illustrated in FIG. 3, the negative electrode 42 includes a negative electrode current collector 42A and a negative electrode active material layer 42B.

The negative electrode current collector 42A has two opposed surfaces on each of which the negative electrode active material layer 42B is to be provided. The negative electrode current collector 42A includes an electrically conductive material such as a metal material. Examples of the metal material include copper.

The negative electrode active material layer 42B is provided on each of the two opposed surfaces of the negative electrode current collector 42A. The negative electrode active material layer 42B includes one or more of negative electrode active materials into which lithium is insertable and from which lithium is extractable. Note that the negative electrode active material layer 42B may be provided only on one of the two opposed surfaces of the negative electrode current collector 42A. The negative electrode active material layer 42B may further include other materials including, without limitation, a negative electrode binder and a negative electrode conductor. Details of the negative electrode binder are similar to those of the positive electrode binder. Details of the negative electrode conductor are similar to those of the positive electrode conductor. A method of forming the negative electrode active material layer 42B is not particularly limited, and specifically includes one or more of methods including, without limitation, a coating method, a vapor-phase method, a liquid-phase method, a thermal spraying method, and a firing (sintering) method.

The negative electrode active material includes a carbon material, a metal-based material, or both. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0 < x \leq 2$ or $0.2 < x < 1.4$).

Here, the negative electrode 42 has a height greater than a height of the positive electrode 41. That is, the negative electrode 42 protrudes upward relative to the positive electrode 41, and protrudes downward relative to the positive electrode 41. This is for the purpose of preventing precipitation of lithium extracted from the positive electrode 41. The "height" is a dimension corresponding to the height H of the secondary battery described above, that is, a dimension in a vertical direction in each of FIGS. 1 and 2. The definition of the height described here applies also to the following.

The separator 43 is an insulating porous film interposed between the positive electrode 41 and the negative electrode 42 as illustrated in FIGS. 2 and 3. The separator 43 allows lithium ions to pass therethrough while preventing a short circuit between the positive electrode 41 and the negative electrode 42. The separator 43 includes a polymer compound such as polyethylene.

Here, the separator 43 has a height greater than the height of the negative electrode 42. That is, the separator 43 protrudes upward relative to the negative electrode 42, and protrudes downward relative to the negative electrode 42. This is for the purpose of insulating the positive electrode lead 51 from the negative electrode 42 using the separator 43, as will be described later.

The electrolytic solution includes a solvent and an electrolyte salt. The positive electrode 41, the negative electrode 42, and the separator 43 are each impregnated with the electrolytic solution. The solvent includes one or more of non-aqueous solvents (organic solvents) including, without limitation, a carbonic-acid-ester-based compound, a carboxylic-acid-ester-based compound, and a lactone-based compound. An electrolytic solution including any of the non-aqueous solvents is a so-called non-aqueous electrolytic solution. The electrolyte salt includes one or more of light metal salts including, without limitation, a lithium salt.

As illustrated in FIG. 2, the positive electrode lead 51 is a wiring member contained inside the outer package can 10 and coupled to each of the positive electrode 41 and the external terminal 20. Here, the secondary battery includes one positive electrode lead 51. However, the secondary battery may include two or more positive electrode leads 51, although not specifically illustrated here.

The positive electrode lead 51 is coupled to an upper end part of the positive electrode 41, more specifically, an upper end part of the positive electrode current collector 41A. Further, the positive electrode lead 51 is coupled to the bottom surface of the external terminal 20 via the through hole 12K provided in the cover part 12. Although not particularly limited, one or more of welding methods including, without limitation, a resistance welding method and a laser welding method are usable for the coupling of the positive electrode lead 51. The details of the welding methods described here apply also to the following.

A portion of the positive electrode lead 51 is insulated from each of the outer package can 10 (the cover part 12) and the battery device 40 (the negative electrode 42), and is sandwiched by the cover part 12 and the battery device 40. That is, of the positive electrode lead 51, the portion located between the external terminal 20 and the positive electrode 41 is substantially or indirectly adjacent to each of the cover part 12 and the battery device 40, and is thus sandwiched by the cover part 12 and the battery device 40 from above and below.

Thus, by extending along a bottom surface of the cover part 12 and a top surface of the battery device 40, the portion of the positive electrode lead 51 is held by the cover part 12 and the battery device 40, and is thereby fixed inside the outer package can 10. A reason for this is that this helps to prevent the positive electrode lead 51 from moving easily even if the secondary battery undergoes an external force such as vibration or shock, and thus helps to prevent the positive electrode lead 51 from being damaged easily. Examples of damage to the positive electrode lead 51 include cracking of the positive electrode lead 51, breaking of the positive electrode lead 51, and falling of the positive electrode lead 51 off the positive electrode 41.

That is, what is meant by a wording "a portion of the positive electrode lead 51 is sandwiched by the outer package can 10 and the battery device 40" is as follows. The positive electrode lead 51 is insulated from the outer package can 10 and the battery device 40, and is held by the outer package can 10 and the battery device 40 from above and below; thus, the positive electrode lead 51 is not easily movable inside the outer package can 10 even if the secondary battery undergoes an external force such as vibration or shock.

Note that the positive electrode lead 51 preferably digs into the battery device 40 as a result of being pressed by the battery device 40. More specifically, because the height of the separator 43 is greater than the height of each of the positive electrode 41 and the negative electrode 42 as described above, the positive electrode lead 51 preferably digs into an upper end part of the separator 43. In this case, as a result of pressing by the positive electrode lead 51, a recessed part is formed in the upper end part of the separator 43, and a portion or all of the positive electrode lead 51 is received in the recessed part. Thus, the positive electrode lead 51 is held by the separator 43. A reason why such a configuration is preferable is that it further prevents the positive electrode lead 51 from easily moving inside the outer package can 10, and thus further prevents the positive electrode lead 51 from being damaged easily.

Here, because the cover part 12 includes the protruding part 12P as described above, the portion of the positive electrode lead 51 is sandwiched by the protruding part 12P and the battery device 40. That is, the portion of the positive electrode lead 51 extends along each of a bottom surface of the protruding part 12P and the top surface of the battery device 40, and is thus held by the protruding part 12P and the battery device 40. A reason for employing such a configuration is that using the protruding part 12P makes it easier to hold the positive electrode lead 51, thus helping to further prevent the positive electrode lead 51 from being damaged easily.

Further, the portion of the positive electrode lead 51 is insulated from the cover part 12 and the negative electrode 42 via each of the separator 43, the sealant 61, and the insulating films 62 and 63.

Specifically, as described above, the height of the separator 43 is greater than the height of the negative electrode 42. Accordingly, the portion of the positive electrode lead 51 is separated from the negative electrode 42 with the separator 43 interposed therebetween, and is thus insulated from the negative electrode 42 via the separator 43. A reason for this is that this prevents a short circuit between the positive electrode lead 51 and the negative electrode 42.

Further, the positive electrode lead 51 is covered at a periphery thereof by the sealant 61 having an insulating property. The portion of the positive electrode lead 51 is thereby insulated from each of the cover part 12 and the negative electrode 42 via the sealant 61. A reason for this is that this prevents a short circuit between the positive electrode lead 51 and the cover part 12, and also prevents a short circuit between the positive electrode lead 51 and the negative electrode 42.

Further, the insulating film 62 is disposed between the cover part 12 and the positive electrode lead 51. The portion of the positive electrode lead 51 is thereby insulated from the cover part 12 via the insulating film 62. A reason for this is that this prevents a short circuit between the positive electrode lead 51 and the cover part 12.

Furthermore, the insulating film 63 is disposed between the battery device 40 and the positive electrode lead 51. The portion of the positive electrode lead 51 is thereby insulated from the negative electrode 42 via the insulating film 63. A reason for this is that this prevents a short circuit between the positive electrode lead 51 and the negative electrode 42.

Details of a material included in the positive electrode lead 51 are similar to the details of the material included in the positive electrode current collector 41A. Note that the material included in the positive electrode lead 51 and the material included in the positive electrode current collector 41A may be the same as or different from each other.

Here, the positive electrode lead 51 is coupled to the positive electrode 41 on a front side relative to the center line PC, that is, on the right side in FIG. 2. Thus, on the front side relative to the center line PC, the portion of the positive electrode lead 51 is sandwiched by the cover part 12 and the battery device 40 and extends toward the external terminal 20. Note that, in order to be coupled to the external terminal 20, the positive electrode lead 51 bends upward in a crank shape in the middle of extending to the external terminal 20.

Here, as is apparent from FIG. 2, the "front side relative to the center line PC" is one of two regions of the battery device 40 (i.e., a region on the right side relative to the center line PC in FIG. 2) where the battery device 40 is divided into the two regions with respect to the center line PC in the direction along the outer diameter D, and is a region that includes a location where the positive electrode lead 51 is coupled to the positive electrode 41. In contrast, a "back side relative to the center line PC", which will be described later, is the other of the two regions described above, that is, a region on the left side relative to the center line PC, as is apparent from FIG. 2. That is, where the battery device 40 is divided into the two regions with respect to the center line PC in the direction along the outer diameter D, the back side relative to the center line PC is the other of the two regions that includes no location where the positive electrode lead 51 is coupled to the positive electrode 41.

A position of coupling of the positive electrode lead 51 to the positive electrode 41 is not particularly limited, and may be chosen as desired. In particular, the positive electrode lead 51 is preferably coupled to the positive electrode 41 on an inner side of winding of the positive electrode 41 relative to an outermost wind of the positive electrode 41. A reason for this is that such a configuration suppresses corrosion of the outer package can 10 resulting from creeping up of the electrolytic solution, unlike in a case where the positive electrode lead 51 is coupled to the positive electrode 41 in the outermost wind of the positive electrode 41. The "creeping up of the electrolytic solution" refers to a phenomenon in which, in a case where the positive electrode lead 51 is disposed in proximity to an inner wall surface of the outer package can 10, the electrolytic solution in the battery device 40 creeps up along the positive electrode lead 51 to reach the inner wall surface of the outer package can 10, and the outer package can 10 dissolves or changes in color due to contact with the electrolytic solution.

Here, between the positive electrode 41 and the external terminal 20, the positive electrode lead 51 is folded back once or more, thus being folded over itself once or more. The number of times the positive electrode lead 51 is to be folded back is not particularly limited as long as it is once or more. The wording "the positive electrode lead 51 is folded back" means that the positive electrode lead 51 is bent at an angle greater than 90° in the middle thereof.

Specifically, the positive electrode lead 51 is folded back once at a position before the external terminal 20. A reason for this is that a folded-back portion of the positive electrode lead 51 serves as a surplus portion to provide a length margin of the positive electrode lead 51.

As a result, in forming the outer package can 10 using the container part 11 and the cover part 12 in the process of manufacturing the secondary battery, as will be described later, it is possible to set the cover part 12 upright relative to the container part 11 (see FIG. 5). Further, in a case where the secondary battery undergoes an external force such as vibration or shock, it is possible to mitigate the external force by making use of the length margin of the positive electrode lead 51, which helps to prevent the positive electrode lead 51 from being damaged easily. Furthermore, by making use of the length margin of the positive electrode lead 51, it is possible to change the position of coupling of the positive electrode lead 51 to the positive electrode 41 as desired, without changing a length of the positive electrode lead 51.

In this case, the length (an entire length including the length margin) of the positive electrode lead 51 is not particularly limited, and may be chosen as desired. The length of the positive electrode lead 51 is preferably greater than or equal to half the outer diameter D of the outer package can 10, in particular. A reason for this is that a length margin for setting the cover part 12 upright relative to the container part 11 is secured regarding the length of the positive electrode lead 51, which makes it easier to set the cover part 12 upright relative to the container part 11.

A range of coupling of the positive electrode lead 51 to the external terminal 20 is not particularly limited. It is preferable that the range of coupling of the positive electrode lead 51 to the external terminal 20 be wide enough for the positive electrode lead 51 to be prevented from easily falling off the external terminal 20 and be narrow enough to allow for a length margin of the positive electrode lead 51, in particular. A reason why the range of coupling of the positive electrode lead 51 to the external terminal 20 is preferably narrow enough is that a sufficiently large length margin is obtainable because a portion of the positive electrode lead 51 not coupled to the external terminal 20 serves as the length margin.

Note that the positive electrode lead 51 is physically separate from the positive electrode current collector 41A and is thus provided separately from the positive electrode current collector 41A. Alternatively, the positive electrode lead 51 may be physically continuous with the positive electrode current collector 41A and may thus be provided integrally with the positive electrode current collector 41A.

As illustrated in FIG. 2, the negative electrode lead 52 is contained inside the outer package can 10 and is coupled to each of the negative electrode 42 and the outer package can 10 (the container part 11). Here, the secondary battery includes one negative electrode lead 52. However, the secondary battery may include two or more negative electrode leads 52, although not specifically illustrated here.

The negative electrode lead 52 is coupled to a lower end part of the negative electrode 42, more specifically, a lower end part of the negative electrode current collector 42A. Further, the negative electrode lead 52 is coupled to a bottom surface of the container part 11. Details of methods usable for the coupling of the negative electrode lead 52 are similar to the details of the methods usable for the coupling of the positive electrode lead 51.

Details of a material included in the negative electrode lead 52 are similar to the details of the material included in the negative electrode current collector 42A. Note that the material included in the negative electrode lead 52 and the material included in the negative electrode current collector 42A may be the same as or different from each other.

A position of coupling of the negative electrode lead 52 to the negative electrode 42 is not particularly limited, and may be chosen as desired. Here, the negative electrode lead 52 is coupled to the negative electrode 42 in an outermost wind of the negative electrode 42.

Note that the negative electrode lead 52 is physically separate from the negative electrode current collector 42A and is thus provided separately from the negative electrode current collector 42A. Alternatively, the negative electrode lead 52 may be physically continuous with the negative electrode current collector 42A and may thus be provided integrally with the negative electrode current collector 42A.

The sealant 61 is a first insulating member covering the periphery of the positive electrode lead 51, as illustrated in FIG. 2, and has a tube-shaped structure. Here, for coupling the positive electrode lead 51 to each of the positive electrode 41 and the external terminal 20, the sealant 61 covers the periphery of a portion in the middle of the positive electrode lead 51.

The sealant 61 includes one or more of insulating materials including, without limitation, a polymer compound having an insulating property. Examples of the insulating materials include polyimide.

The insulating film 62 is a second insulating member disposed between the cover part 12 and the positive electrode lead 51, as illustrated in FIG. 2. Here, the insulating film 62 is ring-shaped in a plan view, and has a through hole at a location corresponding to the through hole 12K.

Here, the insulating film 62 may have an adhesive layer (not illustrated) on one surface, and may thus be coupled to either the cover part 12 or the positive electrode lead 51 via the adhesive layer. Alternatively, the insulating film 62 may have respective adhesive layers (not illustrated) on both surfaces, and may thus be coupled to both the cover part 12 and the positive electrode lead 51 via the respective adhesive layers.

The insulating film 62 includes one or more of insulating materials including, without limitation, a polymer compound having an insulating property. Examples of the insulating materials include polyimide.

The insulating film 63 is a third insulating member disposed between the battery device 40 and the positive electrode lead 51, as illustrated in FIG. 2. Here, the insulating film 63 is flat-plate-shaped in a plan view. The insulating film 63 is disposed to shield the winding center space 40K and to cover the battery device 40 around the winding center space 40K.

Details of a material included in the insulating film 63 are similar to the details of the material included in the insulating film 62. Note that the material included in the insulating film 63 and the material included in the insulating film 62 may be the same as or different from each other.

Note that the secondary battery may further include one or more of other unillustrated components.

For example, the secondary battery includes a safety valve mechanism. The safety valve mechanism cuts off electrical coupling between the outer package can 10 and the battery device 40 (the negative electrode 42) if an internal pressure of the outer package can 10 reaches a certain level or higher. Examples of a factor that causes the internal pressure of the outer package can 10 to reach the certain level or higher include the occurrence of a short circuit in the secondary battery and heating of the secondary battery from outside. A placement location of the safety valve mechanism is not particularly limited. However, the safety valve mechanism is preferably placed on either the bottom part M1 or the bottom part M2, more preferably, on the bottom part M2 to which no external terminal 20 is attached.

Further, the secondary battery includes an insulator between the outer package can 10 and the battery device 40. The insulator includes one or more of materials including, without limitation, an insulating film and an insulating sheet, and prevents a short circuit between the outer package can 10 and the battery device 40 (the positive electrode 41). A range of placement of the insulator is not particularly limited, and may be chosen as desired.

Note that the outer package can 10 is provided with a cleavage valve. The cleavage valve cleaves to release the internal pressure of the outer package can 10 in a case where the internal pressure reaches a certain level or higher. A placement location of the cleavage valve is not particularly limited. However, the cleavage valve is preferably placed on either the bottom part M1 or the bottom part M2, more preferably, on the bottom part M2, as with the placement location of the safety valve mechanism described above.

Upon charging of the secondary battery, in the battery device 40, lithium is extracted from the positive electrode 41, and the extracted lithium is inserted into the negative electrode 42 via the electrolytic solution. Upon discharging of the secondary battery, in the battery device 40, lithium is extracted from the negative electrode 42, and the extracted lithium is inserted into the positive electrode 41 via the electrolytic solution. Upon the charging and the discharging, lithium is inserted and extracted in an ionic state.

FIG. 4 illustrates a perspective configuration of the outer package can 10 to be used in the process of manufacturing the secondary battery, and corresponds to FIG. 1. FIG. 5 illustrates a sectional configuration of the outer package can 10 for describing the process of manufacturing the secondary battery, and corresponds to FIG. 2.

Note that FIG. 4 illustrates a state where the cover part 12 is yet to be welded to the container part 11 and is thus separate from the container part 11. FIG. 5 illustrates a state where the cover part 12 is yet to be welded to the container part 11, and thus the cover part 12 is set upright relative to the container part 11.

In the following description, where appropriate, FIGS. 1 to 3 described already will be referred to in conjunction with FIGS. 4 and 5.

Here, as illustrated in FIG. 4, the container part 11 and the cover part 12 that are physically separate from each other are used to form the outer package can 10. The container part 11 is a generally handless-mug-shaped member in which the bottom part M2 and the sidewall part M3 are integrated with each other, and has the opening 11K. The cover part 12 is a generally plate-shaped member corresponding to the bottom part M1. The external terminal 20 is attached in advance, via the gasket 30, to the recessed part 12H provided in the cover part 12.

Alternatively, the bottom part M2 and the sidewall part M3 may be separate from each other, and the container part 11 may thus be prepared by welding the sidewall part M3 to the bottom part M2.

First, the positive electrode active material is mixed with other materials including, without limitation, the positive electrode binder and the positive electrode conductor to thereby obtain a positive electrode mixture. Thereafter, the positive electrode mixture is put into a solvent such as an organic solvent to thereby prepare a paste positive electrode mixture slurry. Thereafter, the positive electrode mixture slurry is applied on the two opposed surfaces of the positive electrode current collector 41A to thereby form the positive electrode active material layers 41B. Lastly, the positive electrode active material layers 41B are compression-molded by means of, for example, a roll pressing machine.

In this case, the positive electrode active material layers 41B may be heated. The positive electrode active material layers 41B may be compression-molded multiple times. In this manner, the positive electrode 41 is fabricated.

The negative electrode 42 is fabricated in accordance with a procedure similar to the procedure of fabricating the positive electrode 41. Specifically, a paste negative electrode mixture slurry including an organic solvent and a negative electrode mixture (a mixture of the negative electrode active material and any of other materials including, without limitation, the negative electrode binder and the negative electrode conductor) is prepared and thereafter, the negative electrode mixture slurry is applied on the two opposed surfaces of the negative electrode current collector 42A to thereby form the negative electrode active material layers 42B. Thereafter, the negative electrode active material layers 42B are compression-molded by means of, for example, a roll pressing machine. In this manner, the negative electrode 42 is fabricated.

The electrolyte salt is put into the solvent. The electrolyte salt is thereby dispersed or dissolved in the solvent. Thus, the electrolytic solution is prepared.

First, by means of a welding method such as a resistance welding method, the positive electrode lead 51 covered at the periphery thereof by the sealant 61 is coupled to the positive electrode 41 (the positive electrode current collector 41A), and the negative electrode lead 52 is coupled to the negative electrode 42 (the negative electrode current collector 42A).

Thereafter, the positive electrode 41 with the positive electrode lead 51 coupled thereto and the negative electrode 42 with the negative electrode lead 52 coupled thereto are stacked on each other with the separator 43 interposed therebetween, following which the stack of the positive electrode 41, the negative electrode 42, and the separator 43 is wound to thereby fabricate a wound body 40Z, as illustrated in FIG. 4. The wound body 40Z has a configuration similar to that of the battery device 40 except that the positive electrode 41, the negative electrode 42, and the separator 43 are each unimpregnated with the electrolytic solution. Note that FIG. 4 omits the illustration of each of the positive electrode lead 51 and the negative electrode lead 52.

Thereafter, the wound body 40Z with the positive electrode lead 51 and the negative electrode lead 52 each coupled thereto is placed into the container part 11 through the opening 11K. In this case, the negative electrode lead 52 is coupled to the container part 11 by means of a welding method such as a resistance welding method. Thereafter, the insulating film 63 is placed on the wound body 40Z.

Thereafter, the cover part 12 to which the external terminal 20 is attached in advance via the gasket 30 and on which the insulating film 62 is provided in advance is prepared, following which the positive electrode lead 51 is coupled to the external terminal 20 via the through hole 12K by means of a welding method such as a resistance welding method. The wound body 40Z (the positive electrode 41) contained inside the container part 11 and the external terminal 20 attached to the cover part 12 are thereby coupled to each other via the positive electrode lead 51. It thus becomes possible to set the cover part 12 upright relative to the container part 11, as illustrated in FIG. 5, in a state where the wound body 40Z and the external terminal 20 are coupled to each other via the positive electrode lead 51.

Figure 5:
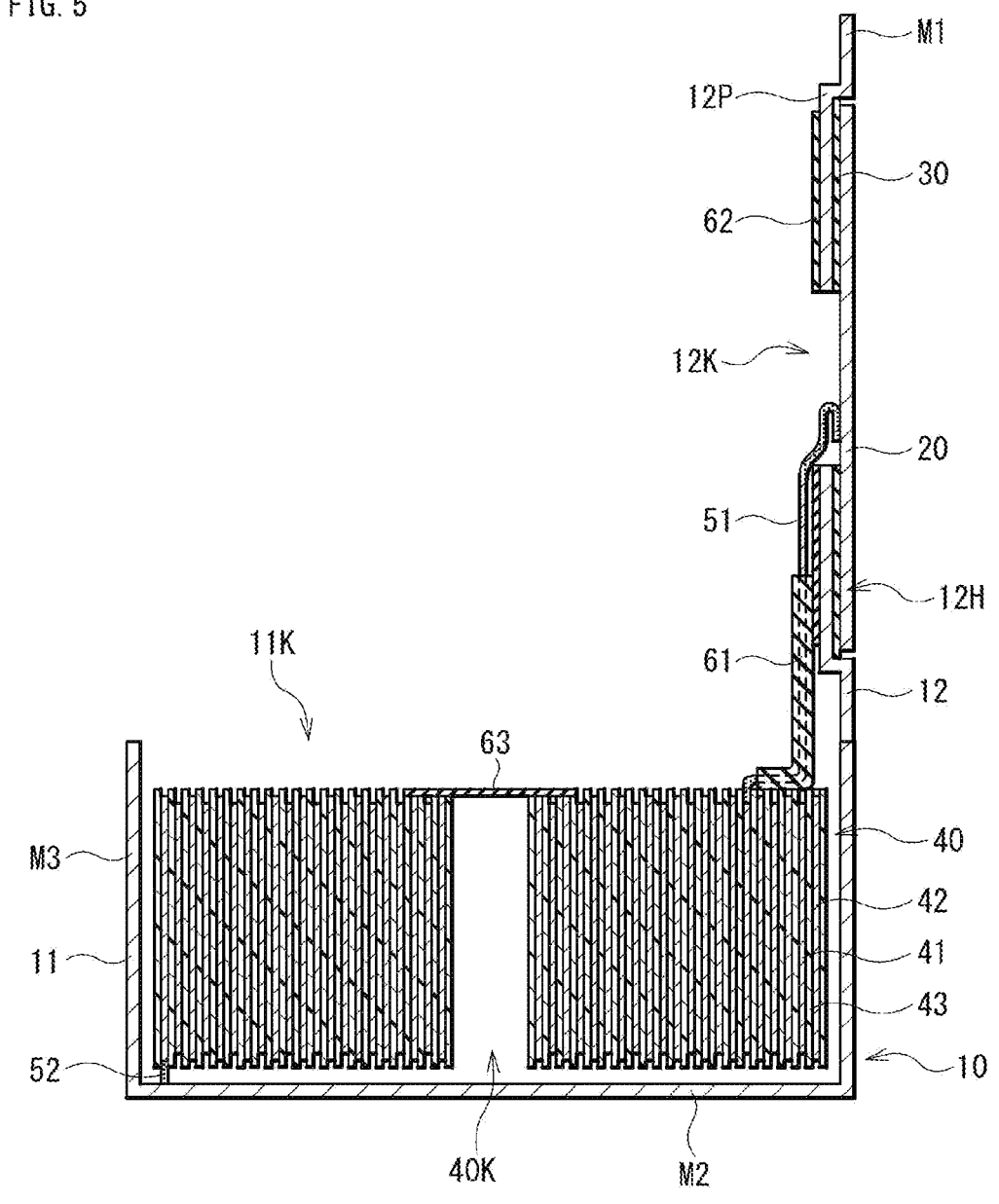
FIG. 5 is a sectional diagram illustrating the configuration of the outer package can for describing the process of manufacturing the secondary battery.

What is meant by "set the cover part 12 upright relative to the container part 11" is that it becomes possible to place the cover part 12 to be substantially orthogonal to the bottom surface of the container part 11 as is apparent from FIG. 5, with the battery device 40 and the external terminal 20 kept coupled to each other via the positive electrode lead 51, in order for the cover part 12 to be out of the way of the opening 11K. In this case, by making the length of the positive electrode lead 51 sufficiently large, the positive electrode lead 51 is prevented from being under excessive tension and being broken even if the cover part 12 is set upright relative to the container part 11.

Thereafter, the electrolytic solution is injected into the container part 11 through the opening 11K. In this case, as described above, the cover part 12 is out of the way of the opening 11K even if the battery device 40 and the external terminal 20 are coupled to each other via the positive electrode lead 51. Accordingly, it is easier to inject the electrolytic solution into the container part 11 through the opening 11K. The wound body 40Z (including the positive electrode 41, the negative electrode 42, and the separator 43) is thereby impregnated with the electrolytic solution. Thus, the battery device 40 which is the wound electrode body is fabricated.

Thereafter, the cover part 12 is so tilted as to get closer to the container part 11, and the opening 11K is thereby shielded using the cover part 12, following which the cover part 12 is welded to the container part 11 by means of a welding method such as a laser welding method. In this case, as illustrated in FIG. 2, welding is performed in such a manner that a portion of the positive electrode lead 51 (the sealant 61) is sandwiched by the cover part 12 (the insulating film 62) and the battery device 40 (the insulating film 63), and that the positive electrode lead 51 is folded back at a location before the location of coupling to the external terminal 20. In this manner, the outer package can 10 is formed, and the components including, without limitation, the battery device 40 are contained inside the outer package can 10. The secondary battery is thus assembled.

The secondary battery after being assembled is charged and discharged. Various conditions including, for example, an environment temperature, the number of times of charging and discharging (the number of cycles), and charging and discharging conditions, may be chosen as desired. As a result, a film is formed on a surface of, for example, the negative electrode 42. This brings the secondary battery into an electrochemically stable state. The secondary battery is thus completed.

According to the secondary battery, the battery device 40 including the positive electrode 41 and the negative electrode 42 is contained inside the outer package can 10, the external terminal 20 is insulated from the outer package can 10 and attached to the outer package can 10, the positive electrode lead 51 is coupled to each of the positive electrode 41 and the external terminal 20, and a portion of the positive electrode lead 51 is insulated from the outer package can 10 and the negative electrode 42, and is sandwiched by the outer package can 10 and the battery device 40.

In this case, as described above, the portion of the positive electrode lead 51 is insulated from and held by the outer package can 10 and the battery device 40. This allows the positive electrode lead 51 to be fixed inside the outer package can 10, and thus prevents the positive electrode lead 51 from being easily movable even if the secondary battery undergoes an external force such as a vibration or shock. The positive electrode lead 51 is thereby prevented from being easily damaged as a result of undergoing an external force. Accordingly, it is possible to achieve superior physical durability.

According to the secondary battery of an embodiment, in particular, the above-described advantages (action and effects) are obtainable for the following reasons.

The secondary battery of an embodiment, which is referred to by a term such as the coin type or the button type, that is, a secondary battery having a flat and columnar three-dimensional shape, includes the external terminal 20, as is apparent from FIGS. 1 and 2. The external terminal is small in size and serves as the external coupling terminal for the positive electrode 41. In this case, due to the external terminal 20 being small in size, the positive electrode lead 51 has a small contact area with the external terminal 20. Accordingly, in order to maintain an electrical coupling state between the external terminal 20 and the positive electrode lead 51, it is necessary to sufficiently fix the positive electrode lead 51 inside the outer package can 10.

In this regard, according to the secondary battery of an embodiment, even if the positive electrode lead 51 has a small contact area with the external terminal 20 because of being coupled to the small-sized external terminal 20, the positive electrode lead 51 is sufficiently fixed inside the outer package can 10, and is thus prevented from being easily damaged as a result of undergoing an external force. Accordingly, even if the secondary battery undergoes an external force, it is easier to maintain the electrical coupling state between the external terminal 20 and the positive electrode lead 51. This provides an advantage that the physical durability improves.

In the secondary battery of an embodiment including the external terminal 20 which is small in size and serves as the external coupling terminal for the positive electrode 41, as is apparent from FIG. 2, the outer package can 10 (the cover part 12) serving as the external coupling terminal for the negative electrode 42 is located in close vicinity to the external terminal 20. In this case, the two kinds of external coupling terminals (the cover part 12 and the external terminal 20) having respective polarities different from each other are located close to each other. Accordingly, in order to prevent a short circuit between the cover part 12 and the external terminal 20, it is necessary to make the contact area of the positive electrode lead 51 with the external terminal 20 sufficiently small to locate the positive electrode lead 51 sufficiently away from the cover part 12.

In this regard, according to the secondary battery of an embodiment, even if the contact area of the positive electrode lead 51 with the external terminal 20 is small, the positive electrode lead 51 is sufficiently fixed inside the outer package can 10, and is thus prevented from being easily damaged as a result of undergoing an external force. Accordingly, as described above, it is easier to maintain the electrical coupling state between the external terminal 20 and the positive electrode lead 51 even if the secondary battery undergoes an external force. This provides the advantage that the physical durability improves.

In particular, in the secondary battery of an embodiment, the positive electrode lead 51 may be coupled to the positive electrode 41 on the front side relative to the center line PC, and a portion of the positive electrode lead 51 may be sandwiched by the outer package can 10 and the battery device 40 on the front side relative to the center line PC. This allows the positive electrode lead 51 to be sufficiently fixed inside the outer package can 10, and thus sufficiently prevents the positive electrode lead 51 from being damaged easily. Accordingly, it is possible to achieve higher effects.

Further, the outer package can 10 may include the protruding part 12P, and the portion of the positive electrode lead 51 may be sandwiched by the protruding part 12P and the battery device 40. The use of the protruding part 12P makes it further easier to hold the positive electrode lead 51. The positive electrode lead 51 is thus further prevented from being damaged easily. Accordingly, it is possible to achieve higher effects.

In this case, the outer package can 10 may include the recessed part 12H formed by the protruding part 12P, and the external terminal 20 may be placed inside the recessed part 12H. This makes the height H of the secondary battery smaller. Thus, the energy density per unit volume of the secondary battery increases. Accordingly, it is possible to achieve higher effects.

Further, the height of the separator 43 having an insulating property may be greater than the height of the negative electrode 42, and the portion of the positive electrode lead 51 may be insulated from the negative electrode 42 via the separator 43. This prevents a short circuit between the positive electrode lead 51 and the negative electrode 42. Accordingly, it is possible to achieve higher effects.

In this case, the positive electrode 41 and the negative electrode 42 may be opposed to each other with the separator 43 interposed therebetween and be wound, and the positive electrode lead 51 may be coupled to the positive electrode 41 on the inner side of the winding of the positive electrode 41 relative to the outermost wind of the positive electrode 41. This suppresses corrosion of the outer package can 10 resulting from creeping up of the electrolytic solution. Accordingly, it is possible to achieve further higher effects.

Further, the sealant 61 may cover the periphery of the positive electrode lead 51, and the portion of the positive electrode lead 51 may be insulated from each of the outer package can 10 and the negative electrode 42 via the sealant 61. This prevents a short circuit between the positive electrode lead 51 and the outer package can 10, and also prevents a short circuit between the positive electrode lead 51 and the negative electrode 42. Accordingly, it is possible to achieve higher effects.

In this case, if the periphery of the positive electrode lead 51 is covered by the sealant 61, a grip force is generated between the outer package can 10 and the sealant 61, and also between the battery device 40 and the sealant 61, when the positive electrode lead 51 is sandwiched by the outer package can 10 and the battery device 40 via the sealant 61. As a result, it becomes easier for the positive electrode lead 51 to be held by the outer package can 10 and the battery device 40 with the help of the grip force supplied to the positive electrode lead 51 via the sealant 61. This not only allows the positive electrode lead 51 to be simply insulated from the outer package can 10 and the negative electrode 42 via the sealant 61 but also allows the positive electrode lead 51 to be fixed more easily inside the outer package can 10 with the help of the sealant 61. Accordingly, it is possible to achieve further higher effects.

Further, the insulating film 62 may be disposed between the outer package can 10 and the positive electrode lead 51, and the portion of the positive electrode lead 51 may be insulated from the outer package can 10 via the insulating film 62. This prevents a short circuit between the positive electrode lead 51 and the outer package can 10. Accordingly, it is possible to achieve higher effects.

Further, the insulating film 63 may be disposed between the battery device 40 and the positive electrode lead 51, and the portion of the positive electrode lead 51 may be insulated from the negative electrode 42 via the insulating film 63. This prevents a short circuit between the positive electrode lead 51 and the negative electrode 42. Accordingly, it is possible to achieve higher effects.

Further, the outer package can 10 may include the container part 11 and the cover part 12 that are welded to each other, and the positive electrode lead 51 may be folded back once or more. This provides a length margin of the positive electrode lead 51. It thus becomes possible to set the cover part 12 upright relative to the container part 11 in the process of manufacturing the secondary battery, that is, in a process of forming the outer package can 10. This prevents the positive electrode lead 51 from being damaged easily even if the secondary battery undergoes an external force, and allows changing the position of coupling of the positive electrode lead 51 to the positive electrode 41 as desired. Accordingly, it is possible to achieve higher effects.

In this case, the positive electrode lead 51 may have a length greater than or equal to half the outer diameter D of the outer package can 10. This makes it easier to set the cover part 12 upright relative to the container part 11 in the process of manufacturing the secondary battery. Accordingly, it is possible to achieve further higher effects.

Further, the secondary battery may have a flat and columnar shape, that is, the secondary battery may be one referred to by a term such as the coin type or the button type. Even in a case of such a small-sized secondary battery which is highly constrained in terms of size, the positive electrode lead 51 is prevented from being damaged easily. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery described above is appropriately modifiable, as described below according to an embodiment. Note that any two or more of the following series of modifications may be combined with each other.

In FIG. 2, the secondary battery includes all of the sealant 61 and the insulating films 62 and 63. However, although not specifically illustrated here, the secondary battery may not necessarily include all of the sealant 61 and the insulating films 62 and 63 as long as the positive electrode lead 51 is insulated from each of the outer package can 10 and the negative electrode 42.

Specifically, first, in a case where the positive electrode lead 51 is insulated from the negative electrode 42 via the separator 43, the secondary may include no insulating film 63. Second, in a case where the positive electrode lead 51 is insulated from each of the outer package can 10 and the negative electrode 42 via the sealant 61, the secondary battery may not necessarily include one of the insulating film 62 or the insulating film 63, or may include neither the insulating film 62 nor the insulating film 63. Third, in a case where the positive electrode lead 51 is insulated from each of the outer package can 10 and the negative electrode 42 via the separator 43 and the insulating film 62, the secondary battery may not necessarily include one of the sealant 61 or the insulating film 63, or may include neither the sealant 61 nor the insulating film 63.

In such cases also, the positive electrode lead 51 is insulated from the outer package can 10 and the negative electrode 42. Accordingly, it is possible to achieve similar effects.

In FIG. 2, the height of the separator 43 is greater than the height of the negative electrode 42, and thus the positive electrode lead 51 is insulated from the negative electrode 42 via the separator 43. However, in a case where a range of placement of the insulating film 63 is extended to thereby allow the positive electrode lead 51 to be insulated from the negative electrode 42 via the insulating film 63, the height of the separator 43 may not necessarily be greater than the height of the negative electrode 42, and thus the positive electrode lead 51 may not necessarily be insulated from the negative electrode 42 via the separator 43.

In such a case also, it is possible to achieve similar effects because the positive electrode lead 51 is insulated from the negative electrode 42 via the insulating film 63. However, to prevent precipitation of lithium extracted from the positive electrode 41, the height of the separator 43 is preferably greater than the height of the negative electrode 42.

In FIG. 2, the insulating film 62 covers only the bottom surface of the cover part 12 (the protruding part 12P). However, a range of placement of the insulating film 62 is not particularly limited as long as the portion of the positive electrode lead 51 is insulated from the outer package can 10 via the insulating film 62.

Figure 6:
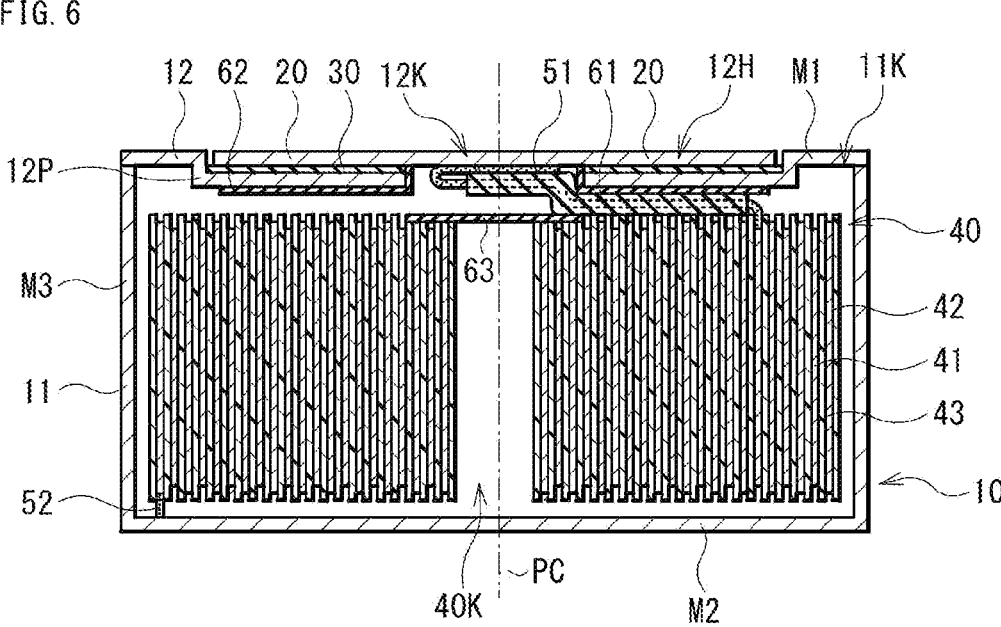
FIG. 6 is a sectional view of a configuration of a secondary battery of an embodiment.

Specifically, as illustrated in FIG. 6 corresponding to FIG. 2, the insulating film 62 may cover not only the bottom surface of the cover part 12 but also a side surface of the cover part 12, that is, an inner wall surface of the cover part 12 at the through hole 12K. In this case, a portion of the positive electrode lead 51 that is not covered by the sealant 61 and is thus exposed is prevented from coming into contact with the cover part 12 easily. Thus, a short circuit between the positive electrode lead 51 and the outer package can 10 is prevented further. Accordingly, it is possible to achieve higher effects.

In FIG. 2, a portion of the positive electrode lead 51 is sandwiched by the outer package can 10 and the battery device 40 on the front side relative to the center line PC, and the positive electrode lead 51 is folded back at a position immediately before the position of coupling to the external terminal 20. However, a range over which the positive electrode lead 51 is sandwiched by the outer package can 10 and the battery device 40 is not particularly limited, and the position where the positive electrode lead 51 is to be folded back is not particularly limited.

Figure 7:
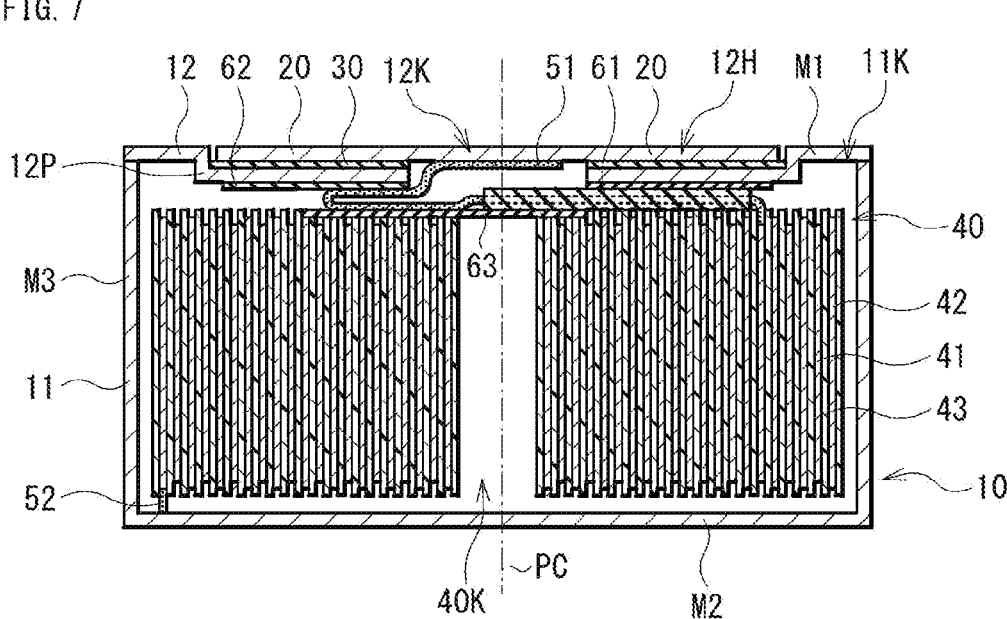
FIG. 7 is a sectional view of a configuration of a secondary battery of an embodiment.

Specifically, as illustrated in FIG. 7 corresponding to FIG. 2, the positive electrode lead 51 may extend from the front side relative to the center line PC to the back side relative to the center line PC. Thus, the positive electrode lead 51 may be folded back on the back side relative to the center line PC, and a portion of the positive electrode lead 51 may be sandwiched by the outer package can 10 and the battery device 40 further on the back side relative to the center line PC. In this case, the range of placement of the insulating film 63 may be extended toward the back side relative to the center line PC. Here, the sealant 61 covers the periphery of a non-folded-back portion of the positive electrode lead 51.

In this case, the positive electrode lead 51 is held also on the back side relative to the center line PC, and the length margin of the positive electrode lead 51 increases. The positive electrode lead 51 is thus further prevented from being damaged easily. Accordingly, it is possible to achieve higher effects.

Figure 8:
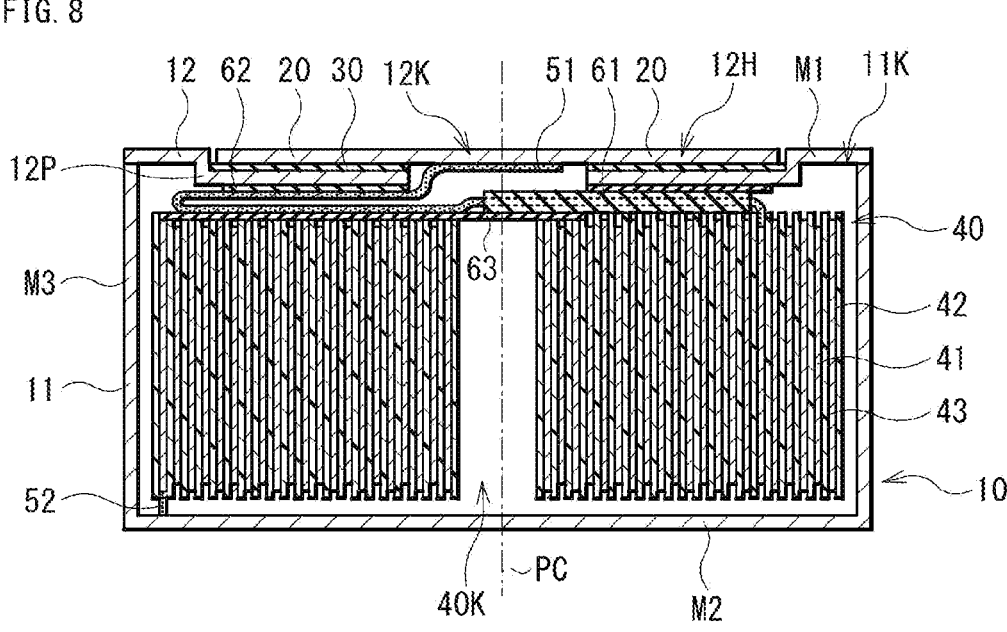
FIG. 8 is a sectional view of a configuration of a secondary battery of an embodiment.

Note that in FIG. 7, the positive electrode lead 51 extends to below the protruding part 12P and is folded back below the protruding part 12P on the back side relative to the center line PC. However, as illustrated in FIG. 8 corresponding to FIG. 7, the positive electrode lead 51 may extend beyond the protruding part 12P and may be folded back at a location beyond the protruding part 12P on the back side relative to the center line PC. The range of placement of the insulating film 63 may be extended further toward the back side relative to the center line PC. In this case, the length margin of the positive electrode lead 51 increase further. Accordingly, it is possible to achieve further higher effects.

Figure 9:
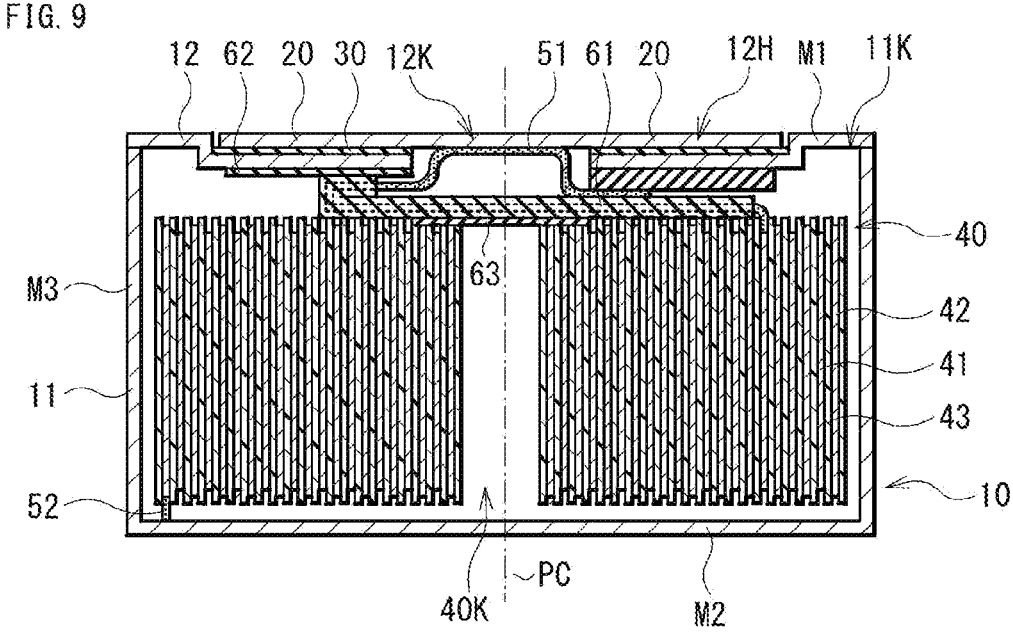
FIG. 9 is a sectional view of a configuration of a secondary battery of an embodiment.

A range of the positive electrode lead 51 to be covered by the sealant 61 is not particularly limited, and may be chosen as desired. Specifically, as illustrated in FIG. 9 corresponding to FIG. 7, the sealant 61 may cover not only the non-folded-back portion of the positive electrode lead 51 but also the folded-back portion of the positive electrode lead 51. That is, when the positive electrode lead 51 is folded back, the sealant 61 covering the periphery of the positive electrode lead 51 may also be folded back together.

In this case, as a result of the sealant 61 being folded back, the outer package can 10 (the cover part 12) becomes farther from the positive electrode lead 51. Some measures may thus be taken in order to maintain the state where the positive electrode lead 51 is sandwiched by the outer package can 10 and the battery device 40. Specifically, the positive electrode lead 51 may be extended beyond the location where the positive electrode lead 51 is coupled to the external terminal 20, and the extended portion of the positive electrode lead 51 may thus be disposed between the outer package can 10 and the battery device 40. Alternatively, the insulating film 62 may be increased in thickness in part.

In this case, it becomes easier for the positive electrode lead 51 to be insulated from the outer package can 10 and the negative electrode 42 via the sealant 61. Accordingly, it is possible to achieve higher effects.

Figure 10:
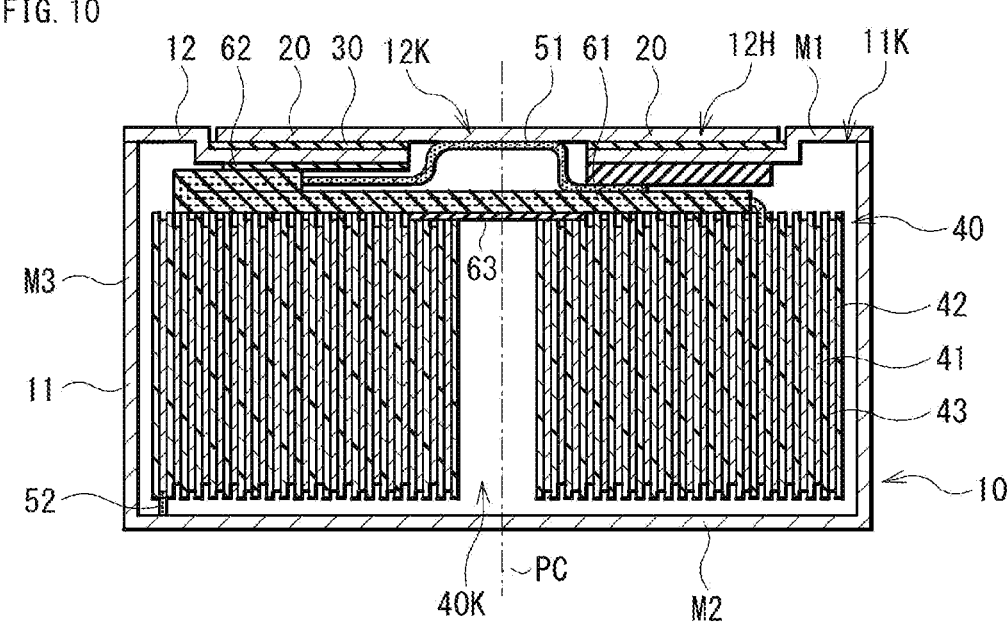
FIG. 10 is a sectional view of a configuration of a secondary battery of an embodiment.

Needless to say, as illustrated in FIG. 10 corresponding to FIGS. 8 and 9, in the case where the positive electrode lead 51 is folded back at a location beyond the protruding part 12P, the sealant 61 may cover also the folded-back portion of the positive electrode lead 51.

In this case, it becomes easier for the positive electrode lead 51 to be insulated from the outer package can 10 and the negative electrode 42 via the sealant 61 even if the positive electrode lead 51 is increased in length in order to increase the length margin. Accordingly, it is possible to achieve higher effects.

In FIG. 2, the insulating film 63 is disposed to cover the winding center space 40K and the battery device 40 around the winding center space 40K. However, the range of placement of the insulating film 63 is not particularly limited as long as the positive electrode lead 51 is insulated from the negative electrode 42 via the insulating film 63.

Figure 11:
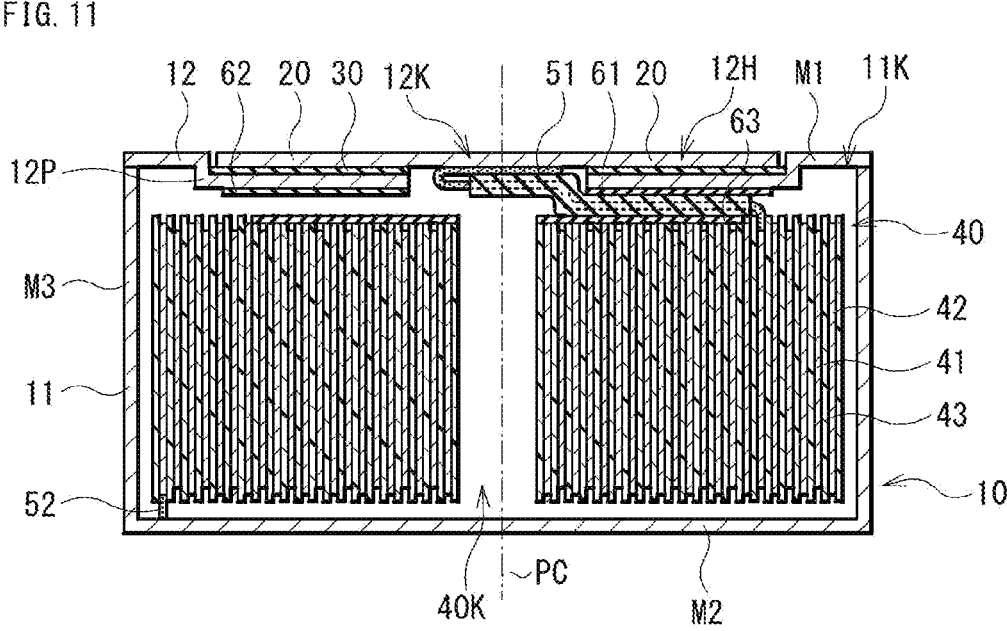
FIG. 11 is a sectional view of a configuration of a secondary battery of an embodiment.

Specifically, as illustrated in FIG. 11 corresponding to FIG. 2, the insulating film 63 may have a configuration similar to that of the insulating film 62. That is, the insulating film 63 may be ring-shaped in a plan view, having a through hole at a location corresponding to the through hole 12K.

Figure 12:
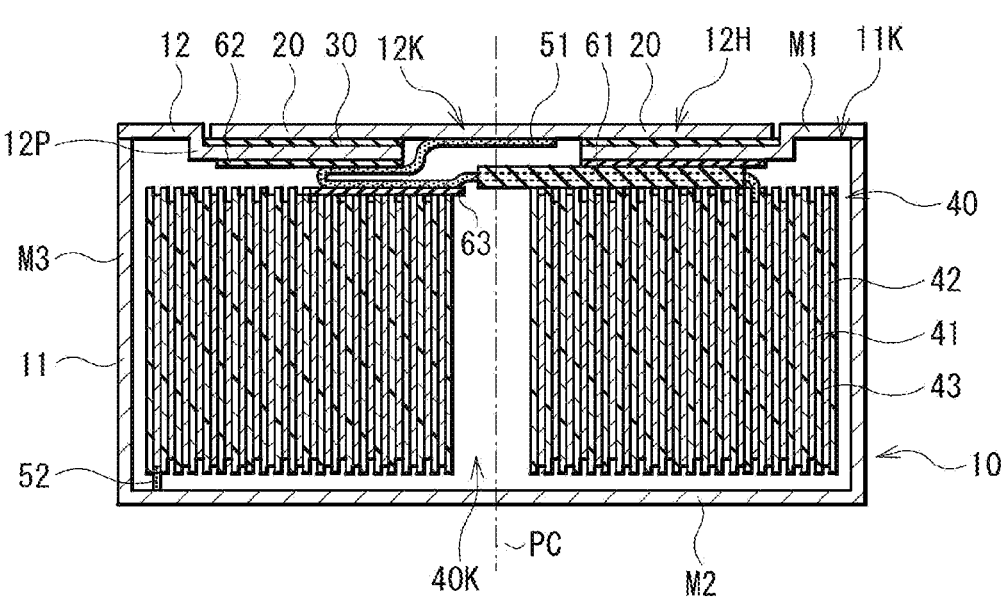
FIG. 12 is a sectional view of a configuration of a secondary battery of an embodiment.

Alternatively, as illustrated in FIG. 12 corresponding to FIG. 7, in the case where the positive electrode lead 51 is folded back below the protruding part 12P, the insulating film 63 may be disposed only between the battery device 40 and a portion of the positive electrode lead 51 not covered at the periphery thereof by the sealant 61.

In such cases also, the portion of the positive electrode lead 51 that is not covered by the sealant 61 and is thus exposed is prevented from coming into contact with the negative electrode 42 easily. Thus, a short circuit between the positive electrode lead 51 and the negative electrode 42 is prevented further. Accordingly, it is possible to achieve higher effects.

Note that two or more of modifications may be combined with each other, as described above.

Figure 13:
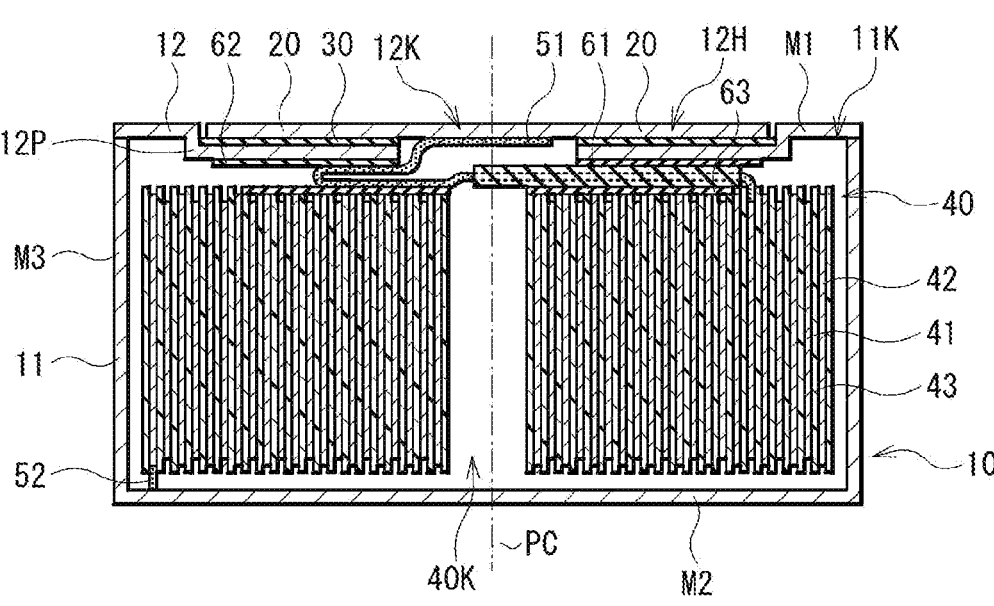
FIG. 13 is a sectional view of a configuration of a secondary battery of an embodiment.

Specifically, as illustrated in FIG. 13 corresponding to FIGS. 7 and 11, such modifications may be combined with each other. Thus, in a case where the positive electrode lead 51 is folded back below the protruding part 12P and where the folded-back portion of the positive electrode lead 51 is not covered at the periphery thereof by the sealant 61, the insulating film 63 may be employed that is ring-shaped in a plan view.

Figure 14:
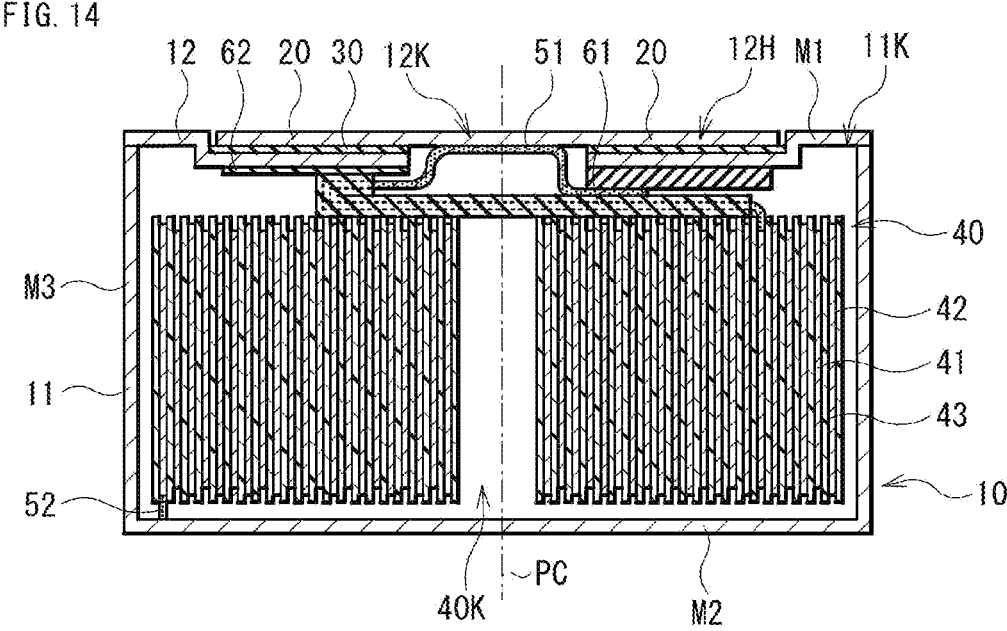
FIG. 14 is a sectional view of a configuration of a secondary battery of an embodiment.

Alternatively, as illustrated in FIG. 14 corresponding to FIGS. 7 and 9, such modifications may be combined with each other. Thus, in a case where the positive electrode lead 51 is folded back below the protruding part 12P, where a tip portion of the positive electrode lead 51 is extended, and where the folded-back portion of the positive electrode lead 51 is covered at the periphery thereof by the sealant 61, the insulating film 63 may be omitted.

Figure 15:
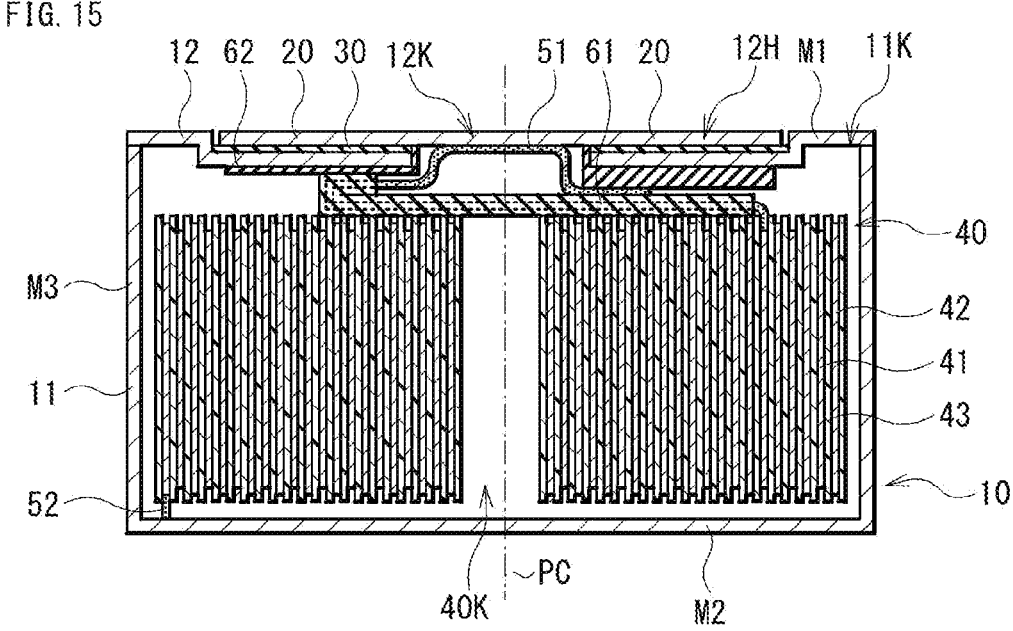
FIG. 15 is a sectional view of a configuration of a secondary battery of an embodiment.

Alternatively, as illustrated in FIG. 15 corresponding to FIGS. 6, 7, and 9, such modifications may be combined with each other. Thus, in a case where the positive electrode lead 51 is folded back below the protruding part 12P, where the tip portion of the positive electrode lead 51 is extended, and where the folded-back portion of the positive electrode lead 51 is covered at the periphery thereof by the sealant 61, the range of placement of the insulating film 62 may be extended.

Figure 16:
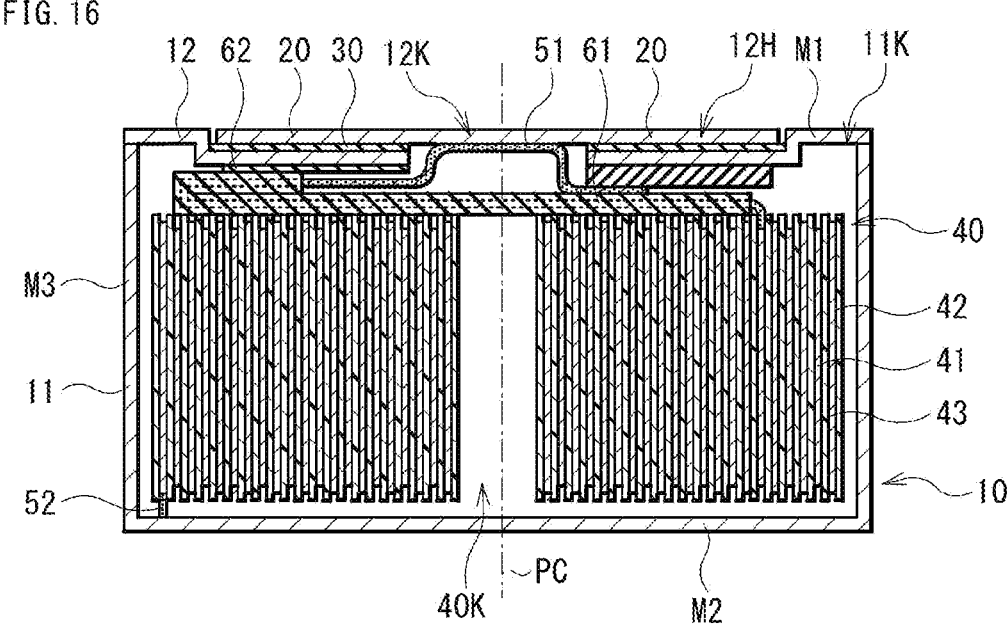
FIG. 16 is a sectional view of a configuration of a secondary battery of an embodiment.

Alternatively, as illustrated in FIG. 16 corresponding to FIGS. 10 and 14, such modifications may be combined with each other. Thus, in a case where the positive electrode lead 51 is folded back at a location beyond the protruding part 12P, where the tip portion of the positive electrode lead 51 is extended, and where the folded-back portion of the positive electrode lead 51 is covered at the periphery thereof by the sealant 61, the insulating film 63 may be omitted.

In FIG. 2, the outer package can 10 is used in which the flat external terminal 20 is attached to an outer side of the cover part 12 including the protruding part 12P (or the recessed part 12H). However, the configuration of the outer package can 10 is not particularly limited, and may be changed as desired. Note that a series of secondary batteries to be described below has a configuration similar to that of the secondary battery illustrated in FIG. 2, except that the configuration of each of the cover part 12 and the external terminal 20 is different.

Figure 17:
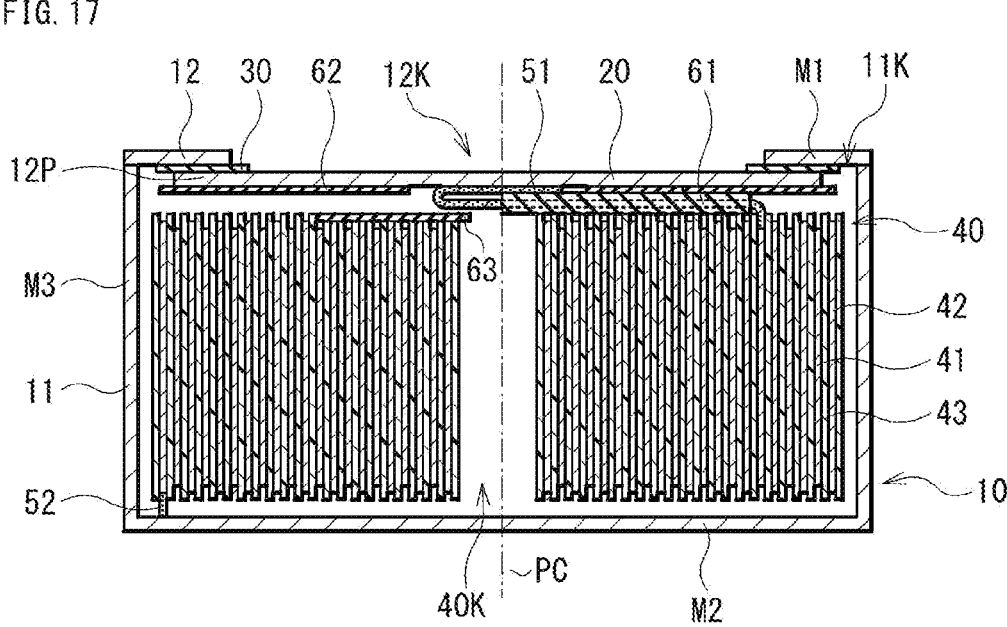
FIG. 17 is a sectional view of a configuration of a secondary battery of an embodiment.

Specifically, as illustrated in FIG. 17 corresponding to FIG. 2, the outer package can 10 may be used in which the flat external terminal 20 is attached to an inner side of the cover part 12 that is flat and includes no protruding part 12P. In this outer package can 10, the flat external terminal 20 is attached via the gasket 30 to the inner side of the cover part 12 having the through hole 12K, and the external terminal 20 is exposed in part at the through hole 12K. In this case, a placement location of the insulating film 63 may be adjusted in order to suppress a short circuit between the negative electrode 42 and a portion of the positive electrode lead 51 not covered at the periphery thereof by the sealant 61.

Figure 18:
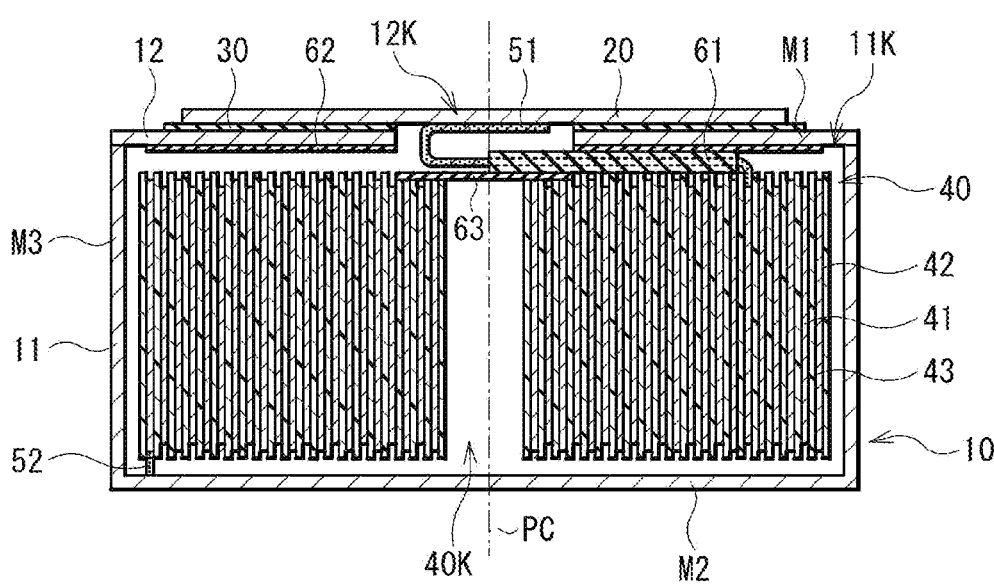
FIG. 18 is a sectional view of a configuration of a secondary battery of an embodiment.

Alternatively, as illustrated in FIG. 18 corresponding to FIG. 2, the outer package can 10 may be used in which the flat external terminal 20 is attached to the outer side of the cover part 12 that is flat and includes no protruding part 12P. In this outer package can 10, the external terminal 20 is attached via the gasket 30 to the outer side of the cover part 12 having the through hole 12K.

Figure 19:
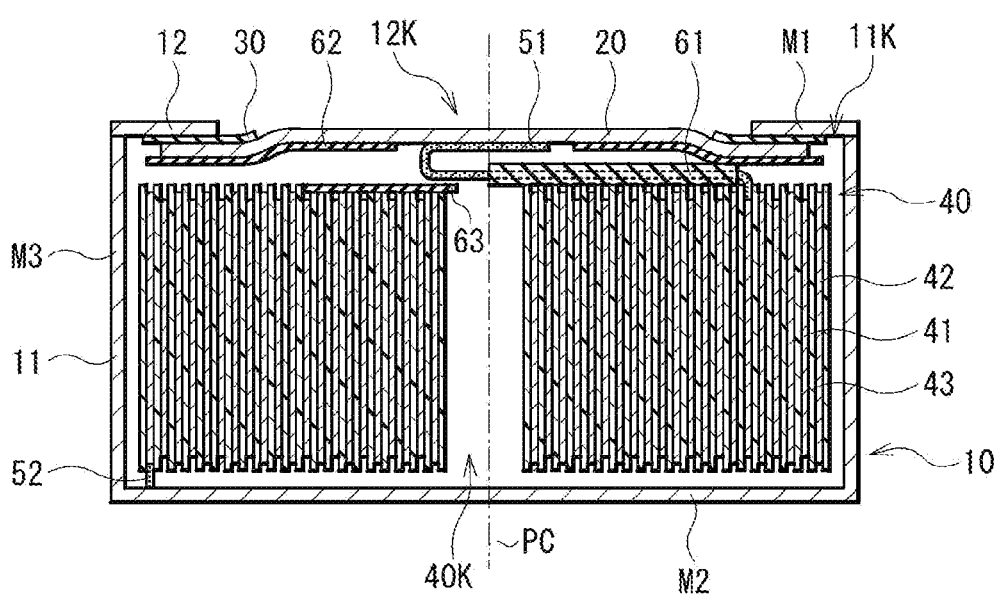
FIG. 19 is a sectional view of a configuration of a secondary battery of an embodiment.

Alternatively, as illustrated in FIG. 19 corresponding to FIG. 2, the outer package can 10 may be used in which the external terminal 20 whose center portion is so curved as to protrude in part outward is attached to the inner side of the cover part 12 that is flat and includes no protruding part 12P.

In this outer package can 10, the external terminal 20 is attached via the gasket 30 to the inner side of the cover part 12 having the through hole 12K. In this case, the placement location of the insulating film 63 may be adjusted in order to suppress a short circuit between the negative electrode 42 and the portion of the positive electrode lead 51 not covered at the periphery thereof by the sealant 61.

Figure 20:
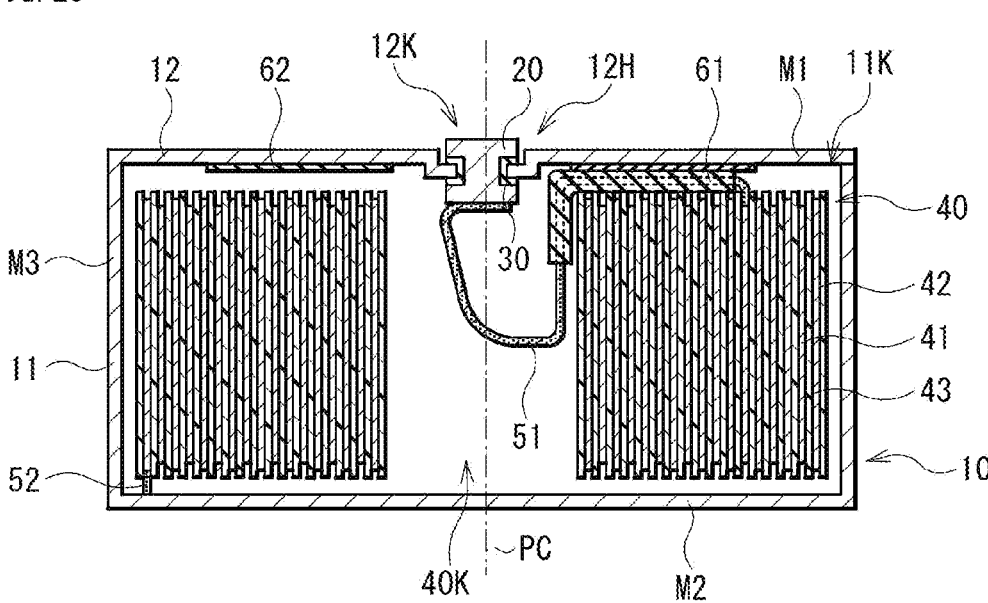
FIG. 20 is a sectional view of a configuration of a secondary battery of an embodiment.

Still alternatively, as illustrated in FIG. 20 corresponding to FIG. 2, the outer package can 10 may be used in which the external terminal 20 is attached to the through hole 12K provided in the cover part 12 (the recessed part 12H), the external terminal 20 extending from inside to outside the cover part 12 via the through hole 12K.

In this outer package can 10, the external terminal 20 is placed in the through hole 12K and attached to the cover part 12 via the gasket 30. The external terminal 20 includes a small-outer-diameter portion placed in the through hole 12K and two large-outer-diameter portions disposed inside and outside the cover part 12. The two large-outer-diameter portions each have an outer diameter larger than an inner diameter of the through hole 12K. The external terminal 20 is thus prevented from falling off the cover part 12 with the help of a difference in outer diameter between the small-outer-diameter portion and the two large-outer-diameter portions.

The large-outer-diameter portion of the external terminal 20 lying inside the cover part 12 is disposed in the winding center space 40K. The positive electrode lead 51 is thus coupled to the external terminal 20 (the large-outer-diameter portion) in the winding center space 40K.

In such cases also, a short circuit between the positive electrode lead 51 and the outer package can 10 is prevented. Accordingly, it is possible to achieve similar effects.

In FIG. 2, the positive electrode 41 is coupled to the external terminal 20 via the positive electrode lead 51, and the negative electrode 42 is coupled to the outer package can 10 via the negative electrode lead 52. Thus, the external terminal 20 serves as the external coupling terminal for the positive electrode 41, and the outer package can 10 serves as the external coupling terminal for the negative electrode 42.

However, although not specifically illustrated here, the positive electrode 41 may be coupled to the outer package can 10 via the positive electrode lead 51, and the negative electrode 42 may be coupled to the external terminal 20 via the negative electrode lead 52. Thus, the outer package can 10 may serve as the external coupling terminal for the positive electrode 41 serving as the second electrode, and the external terminal 20 may serve as the external coupling terminal for the negative electrode 42 serving as the first electrode.

In this case, a portion of the negative electrode lead 52 is insulated from each of the outer package can 10 (the cover part 12) and the battery device 40 (the positive electrode 41), and is sandwiched by the outer package can 10 and the battery device 40. To serve as the external coupling terminal for the negative electrode 42, the external terminal 20 includes one or more of electrically conductive materials including, without limitation, a metal material and an alloy material. Examples of the electrically conductive materials include iron, copper, nickel, stainless steel, an iron alloy, a copper alloy, and a nickel alloy. To serve as the external coupling terminal for the positive electrode 41, the outer package can 10 includes one or more of electrically conductive materials including, without limitation, a metal material and an alloy material. Examples of the electrically conductive materials include aluminum, an aluminum alloy, and stainless steel.

In this case also, the secondary battery is couplable to electronic equipment via the external terminal 20 (the external coupling terminal for the negative electrode 42) and the outer package can 10 (the external coupling terminal for the positive electrode 41). Accordingly, it is possible to achieve similar effects.

EXAMPLES

Examples of the present technology are described below according to an embodiment.

As described below, secondary batteries (lithium-ion secondary batteries) were fabricated, and thereafter the secondary batteries were evaluated for their performance.

[Fabrication of Secondary Battery]

Here, fabricated was a secondary battery of Example 1 illustrated in FIGS. 1 to 3. In this case, secondary batteries of Comparative examples 1 and 2 were also fabricated for comparison.

Example 1

In accordance with a procedure described below, the secondary battery of the coin type was fabricated in which the positive electrode lead 51 was sandwiched by the outer package can 10 and the battery device 40.

(Fabrication of Positive Electrode)

First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on the two opposed surfaces of the positive electrode current collector 41A (a band-shaped aluminum foil having a thickness of 12 μm) by means of a coating apparatus, following which the applied positive electrode mixture slurry was dried to thereby form the positive electrode active material layers 41B. Lastly, the positive electrode active material layers 41B were compression-molded by means of a roll pressing machine. In this manner, the positive electrode 41 having a width of 3.3 mm was fabricated.

(Fabrication of Negative Electrode)

First, 95 parts by mass of the negative electrode active material (graphite) and 5 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the positive electrode mixture slurry was applied on the two opposed surfaces of the negative electrode current collector 42A (a band-shaped copper foil having a thickness of 15 μm) by means of a coating apparatus, following which the applied negative electrode mixture slurry was dried to thereby form the negative electrode active material layers 42B. Lastly, the negative electrode active material layers 42B were compression-molded by means of a roll pressing machine. In this manner, the negative electrode 42 having a width of 3.8 mm was fabricated.

(Preparation of Electrolytic Solution)

The electrolyte salt ($LiPF_6$) was added to the solvent (ethylene carbonate and diethyl carbonate), following which the solvent was stirred. In this case, a mixture ratio (a weight ratio) between ethylene carbonate and diethyl carbonate in the solvent was set to 30:70, and a content of the electrolyte salt was set to 1 mol/kg with respect to the solvent. The electrolyte salt was thereby dissolved or dispersed in the solvent. Thus, the electrolytic solution was prepared.

(Assembly of Secondary Battery)

First, the positive electrode lead 51 (0.1 mm in thickness, 2.0 mm in width, and 11.7 mm in protrusion length from the positive electrode 41) including aluminum and covered in part at the periphery thereof by the sealant 61 (a polypropylene film) was welded to the positive electrode 41 (the positive electrode current collector 41A) by means of a resistance welding method. The sealant 61 had a tube shape and was 9.0 mm in outer diameter and 3.0 mm in inner diameter. Further, the negative electrode lead 52 (0.1 mm in thickness, 2.0 mm in width, and 6.0 mm in protrusion length from the negative electrode 42) including nickel was welded to the negative electrode 42 (the negative electrode current collector 42A) by means of a resistance welding method. In this case, a position of welding of the positive electrode lead 51 was adjusted to be in the middle of the winding of the positive electrode 41.

Thereafter, the positive electrode 41 and the negative electrode 42 were stacked on each other with the separator 43 (a fine-porous polyethylene film having a thickness of 25 μm and a width of 4.0 mm) interposed therebetween, following which the stack of the positive electrode 41, the negative electrode 42, and the separator 43 was wound to thereby fabricate the wound body 40Z having a cylindrical shape (11.6 mm in outer diameter) and having the winding center space 40K (2.0 mm in inner diameter).

Thereafter, a ring-shaped underlay insulating film (a polyimide film, 11.6 mm in outer diameter, 2.2 mm in inner diameter, and 0.05 mm in thickness) was placed, through the opening 11K, into the container part 11 having a cylindrical shape (0.15 mm in thickness, 12.0 mm in outer diameter, and 5.0 mm in height) and including stainless steel (SUS316), following which the wound body 40Z was placed into the container part 11. In this case, the negative electrode lead 52 was welded to the container part 11 by means of a resistance welding method. Thereafter, by means of a resistance welding method, the positive electrode lead 51 was welded to the external terminal 20 attached to the cover part 12 via the gasket 30 (a polyimide film, 9.2 mm in outer diameter and 3.2 mm in inner diameter). The external terminal 20 was disk-shaped (0.3 mm in thickness and 7.2 mm in outer diameter) and included aluminum. The cover part 12 was disk-shaped (0.15 mm in thickness and 11.7 mm in outer diameter), included stainless steel (SUS316), and had the recessed part 12H (9.0 mm in inner diameter and 0.3 mm in step height) with the through hole 12K (3.0 mm in inner diameter) provided therein.

Thereafter, with the cover part 12 set upright relative to the container part 11, the electrolytic solution was injected into the container part 11 through the opening 11K. The wound body 40Z (including the positive electrode 41, the negative electrode 42, and the separator 43) was thereby impregnated with the electrolytic solution. In this manner, the battery device 40 was fabricated.

Lastly, the opening 11K was shielded using the cover part 12, following which the cover part 12 was welded to the container part 11 by means of a laser welding method. In this case, the insulating film 62 having a ring shape (a polyimide film, 9.2 mm in outer diameter and 3.2 mm in inner diameter) was disposed between the cover part 12 and the positive electrode lead 51, and the insulating film 63 having a disk shape (a polyimide film, 3.2 mm in outer diameter) was disposed between the battery device 40 and the positive electrode lead 51. In this manner, the outer package can 10 was formed using the container part 11 and the cover part 12, and the battery device 40 was sealed in the outer package can 10. The secondary battery having an outer diameter of 12.0 mm and a height of 5.0 mm was thus assembled.

(Stabilization of Secondary Battery)

The secondary battery after being assembled was charged and discharged for one cycle in an ambient temperature environment (at a temperature of 23° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C is a value of a current that causes the battery capacity (a theoretical capacity) to be completely discharged in 10 hours, and 0.05 C is a value of a current that causes the battery capacity to be completely discharged in 20 hours.

As a result, a film was formed on the surface of, for example, the negative electrode 42 to thereby electrochemically stabilize the state of the secondary battery. Thus, the secondary battery was completed.

Comparative Example 1

In accordance with a procedure described below, a secondary battery of a cylindrical type was fabricated in which the positive electrode lead was not sandwiched by the outer package can and the battery device. This secondary battery had a configuration similar to that of the secondary battery disclosed in PTL 1 (Japanese Unexamined Patent Application Publication No. 2013-097903) described above.

The procedure of fabricating this secondary battery of the cylindrical type (Comparative example 1) was similar to the procedure of fabricating the secondary battery of the coin type (Example 1) except for the following. In this case, the width of the positive electrode was set to 1.6 mm, the width of the negative electrode was set to 2.1 mm, the width of the separator was set to 2.3 mm, the protrusion length of the positive electrode lead was set to 15.0 mm, and neither the insulating film 62 nor the insulating film 63 was used. Further, after the battery device was placed into the container part having a cylindrical shape through the opening, the cover part having a disk shape was crimped to the opening of the container part to thereby fix the cover part to the container part.

In the secondary battery of the cylindrical type (Comparative example 1), the positive electrode lead had a long protrusion length and was not sandwiched by the cover part and the battery device. As a result, a portion of the positive electrode lead was in a free state, not being fixed, in a space between the cover part and the battery device. The portion of the positive electrode lead was bent in an S-shape.

Comparative Example 2

In accordance with a procedure described below, a secondary battery of the coin type was fabricated in which the positive electrode lead was not sandwiched by the outer package can and the battery device. This secondary battery had a configuration similar to that of the secondary battery disclosed in Japanese Unexamined Patent Application Publication No. H10-154505.

The procedure of fabricating the coin-type secondary battery of Comparative example 2 was similar to the procedure of fabricating the coin-type secondary battery of Example 1 except for the following. In this case, two kinds of hollow container members each having one end part open and the other end part closed were crimped to each other to thereby form an outer package can in which the two kinds of container members were so fixed to each other as to contain the battery device inside. Further, with the position of welding of the positive electrode lead set to be in an outermost wind of the positive electrode, the positive electrode lead was welded to one of the container members (the external coupling terminal for the positive electrode) in a surplus space provided beside the battery device. Furthermore, with the position of welding of the negative electrode lead set to be in an innermost wind of the negative electrode, the negative electrode lead was welded to the other of the container members (the external coupling terminal for the negative electrode) in the winding center space.

In the coin-type secondary battery of Comparative example 2, a portion of the positive electrode lead was disposed in the surplus space, and the positive electrode lead was not sandwiched by the container member and the battery device. As a result, the portion of the positive electrode lead was in a free state, not being fixed, in a space between the container and the battery device. The positive electrode lead was bent generally in a V-shape.

The secondary batteries were evaluated for their performance (physical durability). The evaluation revealed the results presented in Table 1. Note that in Table 1, the column of "sandwiching of positive electrode lead" indicates whether the positive electrode was sandwiched by the outer package can and the battery device.

In a case of evaluating the physical durability, the secondary battery was subjected to a vibration test in accordance with the UN Manual of Tests and Criteria to thereby examine whether the secondary battery (the positive electrode lead) was damaged. In this case, 30 secondary batteries were subjected to the vibration test to examine the number of secondary batteries in which the positive electrode lead was broken (the number of breakage defects) and the number of secondary batteries in which the positive electrode lead fell off the positive electrode (the number of falling-off defects).

TABLE 1

| (Number of secondary batteries subjected to vibration test = 30) | | | |
| --- | --- | --- | --- |
| | Sandwiching of positive electrode lead | Number of breakage defects | Number of falling-off defects |
| Example 1 | Yes | 0 | 0 |
| Comparative example 1 | No | 10 | 2 |
| Comparative example 2 | No | 8 | 10 |

As indicated in Table 1, the physical durability of the secondary battery varied depending on the state of the positive electrode lead (whether sandwiched or not) inside the outer package can.

Specifically, in a case where the positive electrode lead was not sandwiched by the outer package can and the battery device (Comparative examples 1 and 2), the positive electrode lead moved violently during the vibration test. As a result, the positive electrode lead was damaged, and thus a number of breakage defects and a number of falling-off defects both occurred. In these cases, in particular, either the number of breakage defects or the number of falling-off defects reached half the number of secondary batteries tested (=30).

In contrast, in a case where the positive electrode lead was sandwiched by the outer package can and the battery device (Example 1), the positive electrode lead hardly moved during the vibration test. As a result, the positive electrode lead was not damaged, and thus the number of breakage defects and the number of falling-off defects were both zero.

The results presented in Table 1 indicate that, in a case where: the battery device 40 including the positive electrode 41 and the negative electrode 42 was contained inside the outer package can 10; the external terminal 20 was insulated from the outer package can 10 and attached to the outer package can 10; the positive electrode lead 51 was coupled to each of the positive electrode 41 and the external terminal 20; and a portion of the positive electrode lead 51 was insulated from each of the outer package can 10 and the negative electrode 42, and was sandwiched by the outer package can 10 and the battery device 40, the secondary battery (the positive electrode lead) was not damaged even upon undergoing an external force (vibration). Accordingly, superior physical durability was achieved in the secondary battery.

Although the present technology has been described above with reference to one or more embodiments including Examples, the configuration of the present technology is not limited thereto, and is therefore modifiable in a variety of ways.

For example, although the description has been given of the case where the outer package can is a welded can (a crimpless can), the outer package can is not particularly limited in configuration, and may be a crimped can which has undergone crimping processing. In the crimped can, a container part and a cover part separate from each other are crimped to each other via a gasket.

Further, although the description has been given of the case where the battery device has a device structure of the wound type, the device structure of the battery device is not particularly limited, and may be of any other type, such as a stacked type in which the electrodes (the positive electrode and the negative electrode) are stacked, or a zigzag folded type in which the electrodes (the positive electrode and the negative electrode) are folded in a zigzag manner.

Further, although the description has been given of the case where the electrode reactant is lithium, the electrode reactant is not particularly limited. Accordingly, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an outer package member;
a battery device contained inside the outer package member and including a first electrode and a second electrode;
an external terminal attached to the outer package member and insulated from the outer package member; and
a coupling wiring line coupled to each of the first electrode and the external terminal, wherein
a portion of the coupling wiring line is insulated from each of the outer package member and the second electrode, and is sandwiched by the outer package member and the battery device such that movement of the coupling wiring line is impeded by being sandwiched between the outer package member and the battery device,
a cover member of the outer package member and the battery device sandwich the coupling wiring line, and
the cover member is in direct physical contact with at least one of the coupling wiring line and insulation of the coupling wiring line.

2. The secondary battery according to claim 1, wherein
the coupling wiring line is coupled to the first electrode on a front side relative to a center of the battery device, and
the portion of the coupling wiring line is sandwiched by the outer package member and the battery device on the front side relative to the center of the battery device.

3. The secondary battery according to claim 2, wherein
the coupling wiring line extends from the front side relative to the center of the battery device to a back side relative to the center of the battery device, and
the portion of the coupling wiring line is sandwiched by the outer package member and the battery device further on the back side relative to the center of the battery device.

4. The secondary battery according to claim 1, wherein
the outer package member includes a protruding part that is formed by the outer package member being so bent as to protrude in part inward, and
the portion of the coupling wiring line is sandwiched by the protruding part and the battery device.

5. The secondary battery according to claim 4, wherein
the outer package member includes a recessed part formed by the protruding part, and
the external terminal is placed inside the recessed part.

6. The secondary battery according to claim 1, wherein
the battery device further includes a separator having an insulating property, the separator being disposed between the first electrode and the second electrode, the separator has a height greater than a height of the second electrode, and
the portion of the coupling wiring line is insulated from the second electrode via the separator.

7. The secondary battery according to claim 6, wherein
the first electrode and the second electrode are opposed to each other with the separator interposed therebetween and are wound, and
the coupling wiring line is coupled to the first electrode on an inner side of winding of the first electrode relative to an outermost wind of the first electrode.

8. The secondary battery according to claim 1, further comprising a first insulating member covering a periphery of the coupling wiring line, wherein
the portion of the coupling wiring line is insulated from each of the outer package member and the second electrode via the first insulating member.

9. The secondary battery according to claim 1, further comprising a second insulating member disposed between the outer package member and the coupling wiring line, wherein
the portion of the coupling wiring line is insulated from the outer package member via the second insulating member.

10. The secondary battery according to claim 1, further comprising a third insulating member disposed between the battery device and the coupling wiring line, wherein
the portion of the coupling wiring line is insulated from the second electrode via the third insulating member.

11. The secondary battery according to claim 1, wherein
the outer package member includes
a container member having an opening, the container member containing the battery device inside, and
the cover member to which the external terminal is attached, the cover member being welded to the container member at the opening, and
the coupling wiring line is folded back once or more.

12. The secondary battery according to claim 11, wherein the coupling wiring line has a length greater than or equal to half an outer diameter of the outer package member.

13. The secondary battery according to claim 1, wherein the secondary battery has a flat and columnar shape.

14. The secondary battery according to claim 1, wherein the secondary battery comprises a lithium-ion secondary battery.

15. The secondary battery according to claim 13, wherein the secondary battery is a coin battery or a button battery.

* * * * *